US011449278B2

(12) United States Patent
Slik

(10) Patent No.: US 11,449,278 B2
(45) Date of Patent: Sep. 20, 2022

(54) METHODS FOR ACCELERATING STORAGE OPERATIONS USING COMPUTATIONAL NETWORK AND STORAGE COMPONENTS AND DEVICES THEREOF

(71) Applicant: NetApp, Inc., Sunnyvale, CA (US)

(72) Inventor: David Slik, British Columbia (CA)

(73) Assignee: NETAPP, INC., Sunnyvale, CA (US)

( * ) Notice: Subject to any disclaimer, the term of this patent is extended or adjusted under 35 U.S.C. 154(b) by 30 days.

(21) Appl. No.: 17/012,652

(22) Filed: Sep. 4, 2020

(65) Prior Publication Data
US 2022/0075557 A1 Mar. 10, 2022

(51) Int. Cl.
G06F 12/00 (2006.01)
G06F 13/00 (2006.01)
G06F 3/06 (2006.01)

(52) U.S. Cl.
CPC .......... *G06F 3/0659* (2013.01); *G06F 3/0604* (2013.01); *G06F 3/067* (2013.01); *G06F 3/0611* (2013.01); *G06F 3/0622* (2013.01); *G06F 3/0641* (2013.01); *G06F 3/0683* (2013.01)

(58) Field of Classification Search
CPC .... G06F 3/0659; G06F 3/0604; G06F 3/0611; G06F 3/0622; G06F 3/0641; G06F 3/067; G06F 3/0683
USPC .......................................................... 711/154
See application file for complete search history.

(56) References Cited

U.S. PATENT DOCUMENTS

| | | | | |
|---|---|---|---|---|
| 2005/0223044 A1* | 10/2005 | Ashworth | ............... | G06F 16/29 |
| 2011/0261049 A1* | 10/2011 | Cardno | ................. | G06Q 10/10 |
| | | | | 345/419 |
| 2014/0201302 A1* | 7/2014 | Dube | ..................... | G06F 12/08 |
| | | | | 709/212 |
| 2016/0344834 A1* | 11/2016 | Das | ..................... | G06F 11/3476 |
| 2016/0366226 A1* | 12/2016 | Friedman | .............. | G06F 3/0608 |
| 2018/0018235 A1* | 1/2018 | Arslan | ................ | G06F 11/1453 |
| 2019/0042144 A1* | 2/2019 | Peterson | ................. | G06F 3/067 |
| 2019/0051206 A1* | 2/2019 | Maleport | ............ | G06F 16/9014 |
| 2019/0138459 A1* | 5/2019 | Briggs | .................. | G06F 12/126 |
| 2019/0379394 A1* | 12/2019 | Hallak | .................. | G06F 16/137 |

(Continued)

OTHER PUBLICATIONS

Beaumont et al., "VorsoNet: A scalable object network based on Voronoi tessellations", 2006, 27pgs.

*Primary Examiner* — Sheng Jen Tsai
(74) *Attorney, Agent, or Firm* — Troutman Pepper Hamilton Sanders LLP (Rochester)

(57) ABSTRACT

Methods, non-transitory machine readable media, and computing devices that accelerate storage operations are disclosed. With this technology, computational storage devices are assigned by a NIC processor of a computational network interface controller (NIC) to storage locations corresponding to respective partitions of an n-dimensional space. One of the storage locations to which a data location in the n-dimensional space maps is then identified by the NIC processor. The data location is determined based on a hash for data associated with a received storage operation. The NIC processor subsequently communicates via a system bus with a storage processor of one of the computational storage device to service the storage operation. The storage processor is coupled directly to flash media of the one of the computational storage device that is assigned to the one of the storage locations and maintains a key/value store comprising the data.

20 Claims, 14 Drawing Sheets

(56) References Cited

U.S. PATENT DOCUMENTS

| | | | |
|---|---|---|---|
| 2020/0250049 A1* | 8/2020 | Lee | G06F 11/1469 |
| 2020/0250141 A1* | 8/2020 | Liu | G06F 11/1469 |
| 2021/0133175 A1* | 5/2021 | Shabi | G06F 16/215 |
| 2021/0173945 A1* | 6/2021 | Karr | H04L 67/1095 |
| 2021/0263651 A1* | 8/2021 | Sandvig | G06F 3/0685 |

* cited by examiner

METHODS FOR ACCELERATING STORAGE OPERATIONS USING COMPUTATIONAL NETWORK AND STORAGE COMPONENTS AND DEVICES THEREOF

FIELD

This technology relates to data storage systems and, more particularly, to methods and devices for accelerating storage operations using computation network and storage components.

BACKGROUND

Traditional storage systems transfer all data from the network into main memory (over the system bus), perform computation, such as compression, deduplication, encryption, and/or protection, then store fragments to multiple disks (again over the system bus). However, solid state disk (SSD) latency and throughput are resulting in bus contention becoming an increasingly common performance bottleneck, particularly in aggregate when a relatively large number of SSDs are connected to a storage system. Each SSD can source and sink only a limited amount of data such that an increased number of SSDs results in increased bus contention and reduced scalability without over-provisioning the system bus.

In addition to the performance impact of bus contention, many traditional data protection and storage optimization techniques employed by current storage systems have conflicting objectives. For example, erasure coding spreads data across multiple storage devices in order to protect against failures. Deduplication aggregates similar data together in order to reduce data storage usage. Additionally, local, high-speed direct access requires that the contents of an object be kept together. Accordingly, these techniques generally do not work well in combination, resulting in many storage hosts turning to relatively simple and suboptimal data replication schemes for data protection, for example.

DETAILED DESCRIPTION

Figure 1:
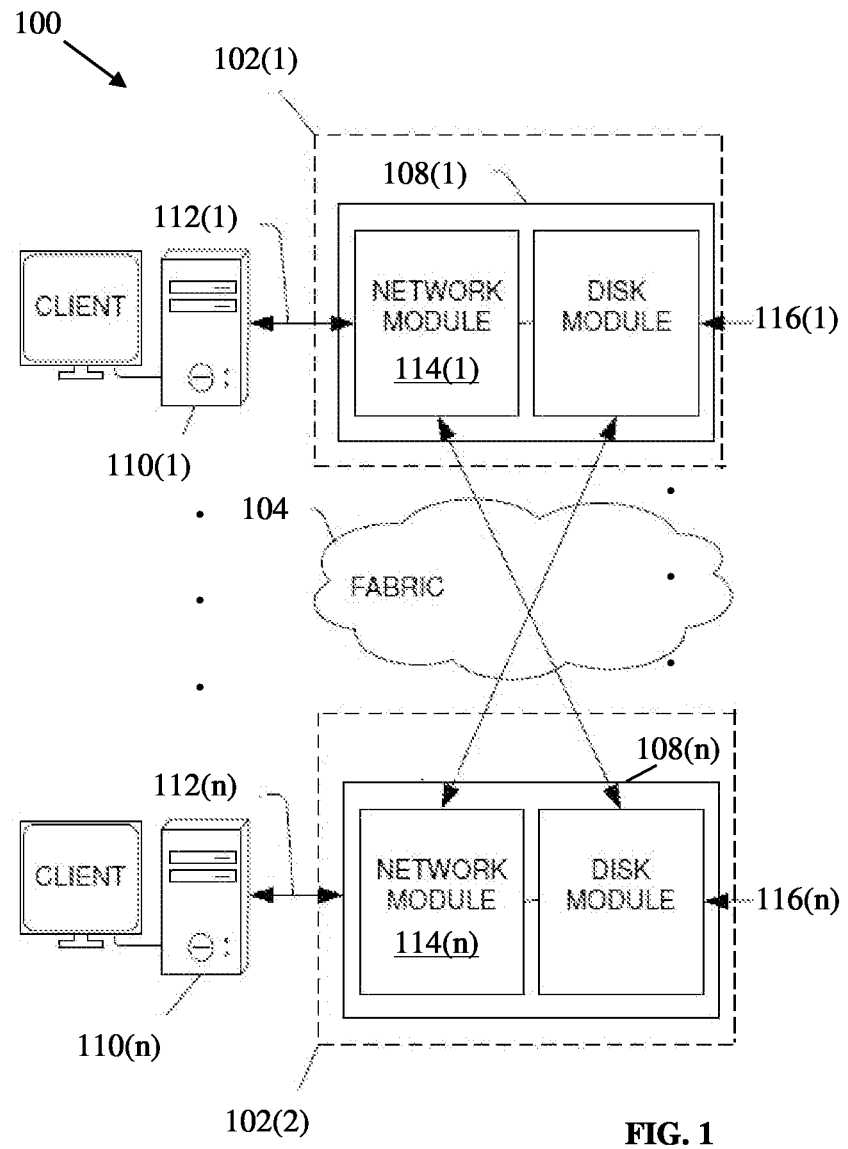
FIG. 1 is a block diagram of a storage network environment with exemplary host computing devices.

A storage network environment 100 that may implement aspects of the technology described and illustrated herein is shown in FIG. 1. The network environment 100 includes host computing devices 102(1)-102(n) that are coupled over a data fabric 104 that includes communication network(s) and facilitates communication between the host computing devices 102(1)-102(n) and cloud data storage 106 in this example, although any number of other elements or components can also be included in the storage network environment 100 in other examples. Additionally, one or more of the host computing device 102(1)-102(n) can be hosted within a data center and/or deployed in the same or different cloud network as the cloud data storage 106 and other configurations can also be used. This technology provides a number of advantages including methods, non-transitory computer readable media, and computing devices that accelerate storage operations by leveraging computational network and storage components.

With this technology, values that need to be accessed or processed locally are stored as a single fragment and similar fragments are routed to the same storage device allowing local deduplication by computational components. Additionally, erasure-coding set membership is determined based on actual fragment placement. Accordingly, this technology provides a storage computing device architecture that leverages network and storage computational components to advantageously enable local processing and accelerated read-only direct access.

Additionally, this technology leverages similarity hashing, systemic erasure coding, Voronoi mapping, efficient deduplication, and key/value storage to improve resource utilization in storage networks and accelerate storage operation processing. In particular, similarity hashing facilitates distribution of similar data to the same data storage devices to improve deduplication ratios. The systemic erasure coding implemented by this technology provides an optimal data protection scheme using redundant distributed data fragments. The Voronoi mapping of this technology facilitates efficient mapping of data to storage devices as well as efficient topology changes for the data storage devices in storage networks. In addition to the similarity hashing, the deduplication implemented by this technology utilizes fragment value hash comparison to determine whether another data copy does not need to be stored on a data storage device and thereby automatically deduplicate the associate data. Further, key/value stores facilitate efficient lookups using local processors at the data storage devices, for example, to service storage operations.

In the examples described and illustrated herein with reference to FIG. 1, nodes 108(1)-108(n) of the host computing devices 102(1)-102(n), respectively, can be primary or local storage controllers or secondary or remote storage controllers that provide client devices 110(1)-110(n) with access to data stored within local storage devices and/or the cloud data storage 106. The host computing devices 102(1)-102(n) of the examples described and illustrated herein are not limited to any particular geographic areas and can be clustered locally and/or remotely. Thus, in one example the host computing devices 102(1)-102(n) can be distributed over a plurality of storage systems located in a plurality of geographic locations; while in another example a clustered network can include host computing devices 102(1)-102(n) residing in a same geographic location (e.g., in a single on-site rack).

In the illustrated example, one or more of the client devices 110(1)-110(n), which may be, for example, personal computers (PCs), application servers, computing devices used for storage (e.g., storage servers), or other computers or peripheral devices, are coupled to the host computing devices 102(1)-102(n) by network connections 112(1)-112(n). Network connections 112(1)-112(n) may include a local area network (LAN) or wide area network (WAN), for example, that utilize Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 110(1)-110(n) may be general-purpose computers running applications and may interact with the host computing devices 102(1)-102(n) using a client/server model for exchange of information. That is, the client devices 110(1)-110(n) may request data from the host computing devices 102(1)-102(2) (e.g., data on the cloud data storage 106 managed by a network storage controller configured to process I/O commands issued by the client devices 110(1)-110(n)), and the host computing devices 102(1)-102(2) may return results of the request to the client devices 110(1)-110(n) via the network connections 112(1)-112(n).

The nodes 108(1)-108(n) of the host computing devices 102(1)-102(n), respectively, can include network or host nodes that are interconnected as a cluster to provide data storage and management services, such as to an enterprise having remote locations, cloud storage, etc., for example. Such nodes 108(1)-108(n) can be attached to the data fabric 104 at a connection point, redistribution point, or communication endpoint, for example. One or more of the nodes 108(1)-108(n) may be capable of sending, receiving, and/or forwarding information over a network communications channel, and could comprise any type of device that meets any or all of these criteria.

In an example, the nodes 108(1)-108(n) may be configured according to a disaster recovery or high availability configuration whereby a surviving takeover node provides switchover access to local data storage and/or cloud data storage 106 in the event a failure or planned takeover event occurs (e.g., the node 102(1) provides client device 110(n) with switchover data access to cloud data storage 106 in the event of a failure of node 102(n)). Additionally, while two nodes and host computing devices are illustrated in FIG. 1, any number of nodes or host computing devices can be included in other examples in other types of configurations or arrangements.

As illustrated in the storage network environment 100, nodes 108(1)-108(n) can include various functional components that coordinate to provide a distributed storage architecture. For example, the nodes 108(1)-108(n) can include network modules 114(1)-114(n) and disk modules 116(1)-116(n), respectively. Network modules 114(1)-114(n) can be configured to allow the nodes 108(1)-108(n) (e.g., network storage controllers) to connect with client devices 110(1)-110(n) over the storage network connections 112(1)-112(n), for example, allowing the client devices 110(1)-110(n) to access data stored in the storage network environment 100.

Further, the network modules 114(1)-114(n) can provide connections with one or more other components through the data fabric 104. For example, the network module 114(1) of node 108(1) can access the cloud data storage 106 by sending a request via the data fabric 104 through the disk module 116(n) of node 108(n). The data fabric 104 can include one or more local and/or wide area computing networks embodied as Infiniband, Fibre Channel (FC), or Ethernet networks, for example, although other types of networks supporting other protocols can also be used.

In some examples, data storage can be locally-attached (e.g., via a system bus) and/or deployed in a cloud network, such as with respect to cloud data storage 106. In some examples, disk modules 116(1)-116(n) can be configured to connect the data storage to the nodes 108(1)-108(n). In other examples, disk modules 116(1)-116(n) communicate with the data storage according to Fabric protocols, such as NVMeoF, for example, although other protocols can also be used. Thus, as seen from an operating system on any of nodes 108(1)-108(n), the data storage can appear as locally attached. In this manner, different nodes 108(1)-108(n) may access data blocks, files, or objects through an operating system, rather than expressly requesting abstract files.

While the storage network environment 100 illustrates an equal number of network modules 114(1)-114(n) and disk modules 116(1)-116(n), other examples may include a differing number of these modules. For example, there may be a plurality of network and disk modules interconnected in a cluster that do not have a one-to-one correspondence between the network and disk modules. That is, different nodes can have a different number of network and disk modules, or the same node can have a different number of network modules than disk modules.

Further, one or more of the client devices 110(1)-110(n) can be networked with the nodes 108(1)-108(2), over the storage connections 112(1)-112(n). As an example, respective client devices 110(1)-110(n) that are networked may request services (e.g., exchanging of information in the form of data packets) of nodes 108(1)-108(n), and the nodes 108(1)-108(n) can return results of the requested services to the client devices 110(1)-110(n). In one example, the client devices 110(1)-110(n) can exchange information with the network modules 114(1)-114(n) residing in the nodes 108(1)-108(n) (e.g., network hosts) in the host computing devices 102(1)-102(n), respectively.

Figure 2:
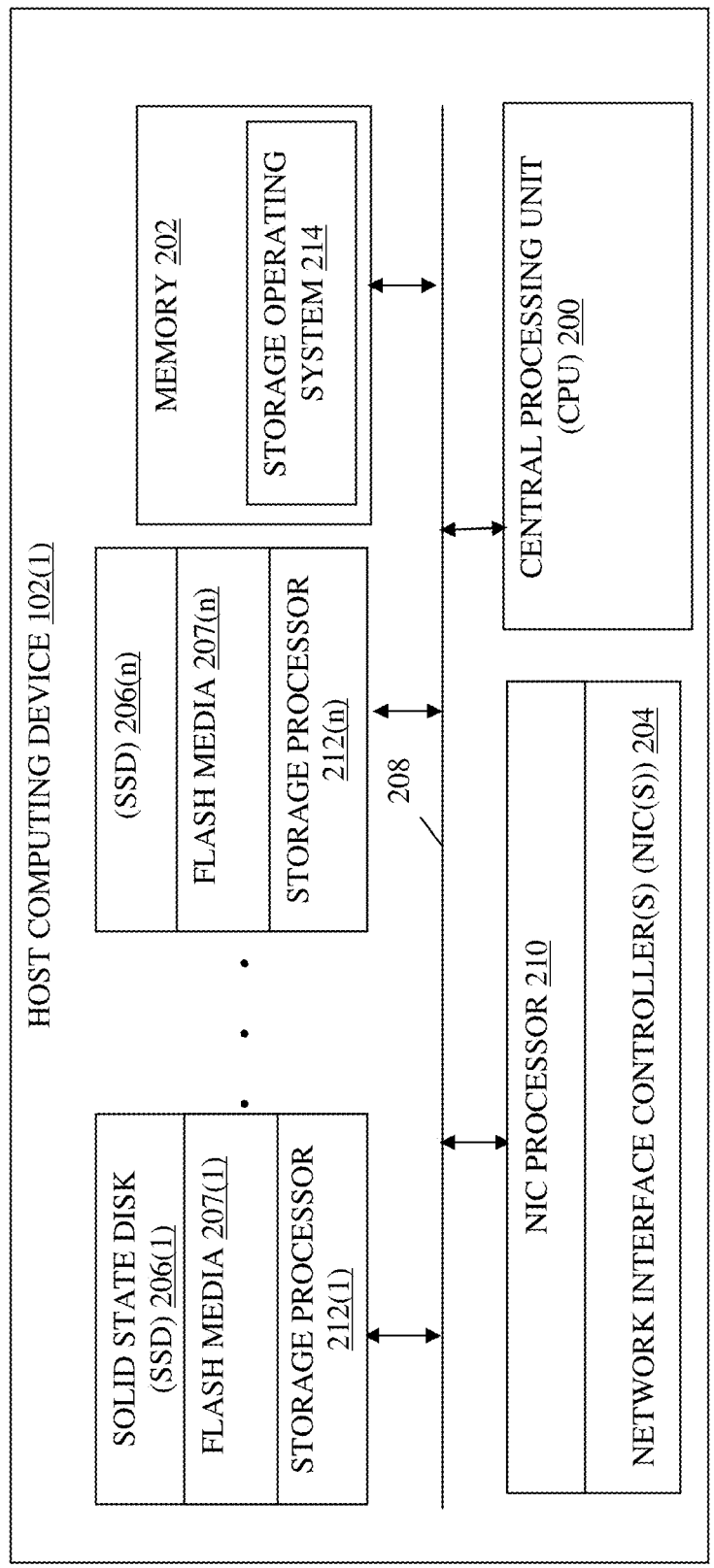
FIG. 2 is a block diagram of an exemplary host computing device.

Referring to FIG. 2, host computing device 102(1) in this particular example includes a central processing unit (CPU) 200, a memory 202, network interface controller(s) (NIC(s)) 204, and solid state disks (SSDs) 206(1)-206(n) interconnected by a system bus 208 (e.g., a peripheral component interconnect express (PCIe) bus, a non-volatile memory express (NVMe) fabric, or an Ethernet switched network. The host computing device 102(1) also includes a storage operating system 214 installed in the memory 202 that includes the network module 114(1), and the disk module 116(1), although other applications and/or module (e.g., a file system module) can also be provided as part of the operating system 212. In this example, the host computing device 102(n) includes the same components of host computing device 102(1), although one or more of the host computing devices can include a different number and/or type of components.

The NIC(s) 204 in this example are computational or smart NIC(s), which one or more of which includes a computational component referred to herein as a NIC processor 210, and optionally includes device memory. The NIC processor 210 facilitates transmission of network data via the data fabric 104 (e.g., data to be written to the SSDs 206(1)-206(n) originating from the client devices 110(1)-110(n)), processes storage operations (e.g., read, write, and delete requests) as described and illustrated by way of the examples herein, and can additionally implement functionality of a storage adapter and/or cluster access adapter. The NIC processor 210 can be a reduced instruction set computer (RISC) microprocessor, such as may be available from ARM Holdings of Cambridge, England as one example, configurable hardware logic (e.g., field programmable gate arrays (FPGAs)), another programmable, low-power computational element, another RISC microprocessor, and/or a combination thereof.

The NIC(s) 204 in this example include the mechanical, electrical, and signaling circuitry needed to connect the host computing device 102(1) to one or more of the client devices 110(1)-110(n) over network connections 112(1)-112(n), which may comprise, among other things, a point-to-point connection or a shared medium, such as a local area network. In some examples, the NIC(s) 204 further communicates (e.g., using TCP/IP) via the data fabric 104 and/or another network (e.g. a WAN) with cloud data storage 106 to process storage operations associated with data stored thereon. Additionally, the NIC(s) 204 can cooperate with the storage operating system 214 executing on the host computing device 102(1) to access information requested by the client devices 110(1)-110(n) (e.g., to access data on the SSDs 206(1)-206(n)).

The SSDs 206(1)-206(n) are each computational or smart storage components that include computational components referred to herein as storage processors 212(1)-212(n). In some examples, the storage processors 212(1)-212(n) also can be RISC microprocessors, configurable hardware logic, another programmable, low-power computational element, and/or a combination thereof. The SSDs 206(1)-206(n) can be part of a mass storage device, such as disks of a disk array. The SSDs 206(1)-206(n) optionally includes device memory (e.g., dynamic random access memory (DRAM) in addition to the flash media 207(1)-207(n)).

While the host computing devices 102(1)-102(n) are disclosed in this example as including only SSDs 206(1)-206(n) for storage, other types of mass storage devices including hard disk drives (HDDs), magnetic disk drives, and any other similar media adapted to store information, including, for example, data and/or parity information, can also be utilized by the host computing device 102(1) in other examples. Additionally, one or more of the SSDs 206(1)-206(n) can be single or dual-port SSDs, optionally coupled to a shelf (not illustrated), although other types of storage devices in other configurations can also be used in other examples.

In one example, the host computing device 102(1) hosts aggregates corresponding to physical local and/or remote data storage devices, such as the flash media 207(1)-207(n) in the SSDs 206(1)-206(n), for example. The aggregates in this example include volumes which are virtual data stores or storage objects that define an arrangement of storage and one or more file systems within the storage network environment 100. Volumes can span a portion of a disk or other storage device, a collection of disks, or portions of disks, for example, and typically define an overall logical arrangement of data storage. In one example, volumes can include stored user data as one or more files, blocks, or objects that reside in a hierarchical directory structure within the volumes.

Volumes are typically configured in formats that may be associated with particular storage systems, and respective volume formats typically comprise features that provide functionality to the volumes, such as providing the ability for volumes to form clusters, among other functionality. Optionally, one or more of the volumes can be in composite aggregates and can extend between one or more of the SSDs 206(1)-206(n) and one or more other storage devices (e.g., within the cloud data storage 106) to provide tiered storage, for example, and other arrangements can also be used in other examples.

To facilitate access to data stored on the SSDs 206(1)-206(n), a file system may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the SSDs 206(1)-206(n), which can be part of a Redundant Array of Independent (or Inexpensive) Disks (RAID system) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

The storage operating system 214 can manage communications for the host computing device 102(1) among other devices that may be in a clustered network, such as attached to a data fabric 104. Thus, the host computing device 102(1) can respond to client requests to manage data on the SSDs 206(1)-206(n), other data storage devices, or the cloud data storage 106 in accordance with the client requests.

A file system module of the storage operating system 214 can establish and manage one or more filesystems including software code and data structures that implement a persistent hierarchical namespace of files and directories, for example. As an example, when a new data storage device (not shown) is added to a clustered network system, the file system module is informed where, in an existing directory tree, new files associated with the new data storage device are to be stored. This is often referred to as "mounting" a filesystem. The storage operating system 214 also invokes storage operations in support of a file service implemented by the host computing device 102(1).

Other processing and memory mechanisms, including various computer readable media, may be used for storing and/or executing application instructions pertaining to the techniques described and illustrated herein. For example, the storage operating system 214 can also utilize one or more control files (not shown) to aid in the provisioning of virtual machines. In the example host computing device 102(1), the memory 202 and/or additional memory of the NIC(s) 204 and/or SSDs 206(1)-206(n) (not shown)) can include software application code and data structures. The CPU 200, NIC processor 210, and storage processors 212(1)-212(n) may, for example, include processing elements and/or logic circuitry configured to execute the software code and manipulate the data structures.

Accordingly, the examples of the technology described and illustrated herein may be embodied as one or more non-transitory computer readable media (e.g., memory 202 and/or device memory on the NIC(s) 204 and/or SSDs 206(1)-2016(n) (not shown)) having machine or processor-executable instructions stored thereon for one or more aspects of the present technology, which when executed (e.g., by the CPU 200, NIC processor 210, and/or storage processors 212(1)-212(n)) cause the processor(s) to carry out the steps necessary to implement the methods of this technology, as described and illustrated with the examples herein. In some examples, the executable instructions are configured to perform one or more steps of a method, such as one or more of the exemplary methods described and illustrated below with reference to FIGS. 3-8, for example.

Figure 3:
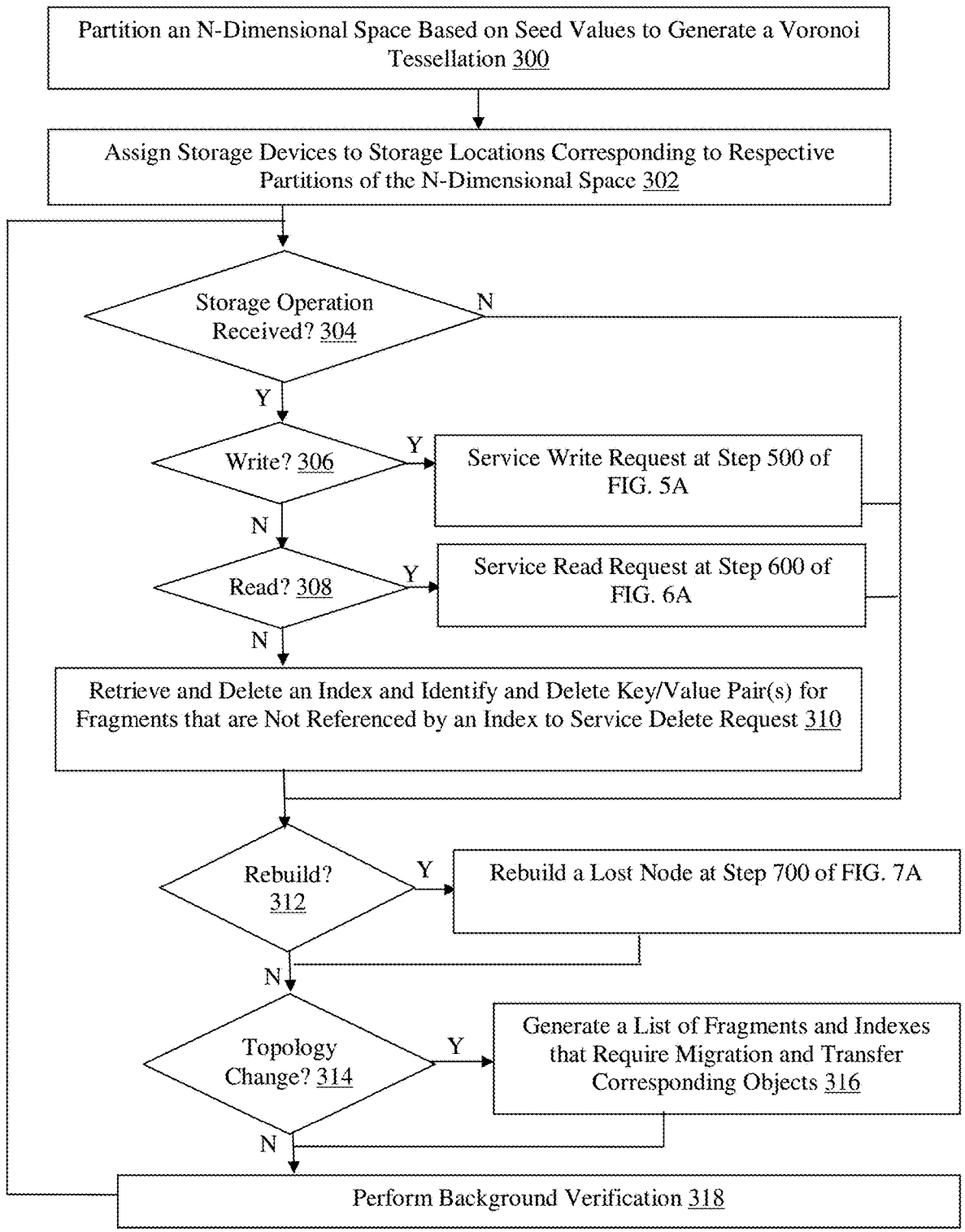
FIG. 3 is a flowchart of an exemplary method for accelerating storage operations using computational network and storage components.

Referring more specifically to FIG. 3, a flowchart of an exemplary method for accelerating storage operations using computational network and storage components is illustrated. While the exemplary methods of FIGS. 3-8 are described and illustrated herein as being performed by the host computing device 102(1), in some examples, the host computing device 102(n) is configured in the same manner as the host computing device 102(1), although other configurations can also be used. Additionally, one or more steps described and illustrated herein with reference to FIGS. 3 and 5-7 can be performed in parallel by one or more of the host computing devices 102(1)-102(n) at any particular point in time.

In step 300 in this example, the NIC processor 210 of the host computing device 102(1) partitions an n-dimensional space, optionally based on seed values or other coordinates within the n-dimensional space. The partitioning can be initiated upon startup of the host computing device 102(1) or at another point in time. A seed value is generated in this example for each hosted physical or virtual storage device (e.g., each of the SSDs 206(1)-206(n)). The generation of the seed values can be based on any number of factors, such as randomized placement, uniform placement, algorithmic placement based on previous deduplication distribution data, and/or weighted placement based on SSD size, for example. In this particular example, the partitioning results in the generation of a Voronoi tessellation, although other types of partitioned n-dimensional spaces can also be used in other examples.

In step 302, the NIC processor 210 of the host computing device 102(1), for example, assigns each of the SSDs 206(1)-206(n) to storage locations corresponding to respective partitions of the n-dimensional space. The NIC processor 210 of the host computing device 102(1) then distributes the list of seed values (also referred to herein as a node seed list) with indications of assigned ones of the SSDs 206(1)-206(n) to all storage entities that manage, store and retrieve data, which include the storage processors 212(1)-212(n) in this example, although other types of storage entities can also be used in other storage network environments. With the list, each of the storage processors 212(1)-212(n) can independently construct an identical Voronoi tessellation. In other examples, the initial assignment, and/or any changes, of the SSDs 206(1)-206(n) to storage locations described and illustrated by way of the examples herein can be performed by the NIC processor 210, a different device within the host computing device 102(1), or a different device or entity within the storage network environment 100.

Figure 4:
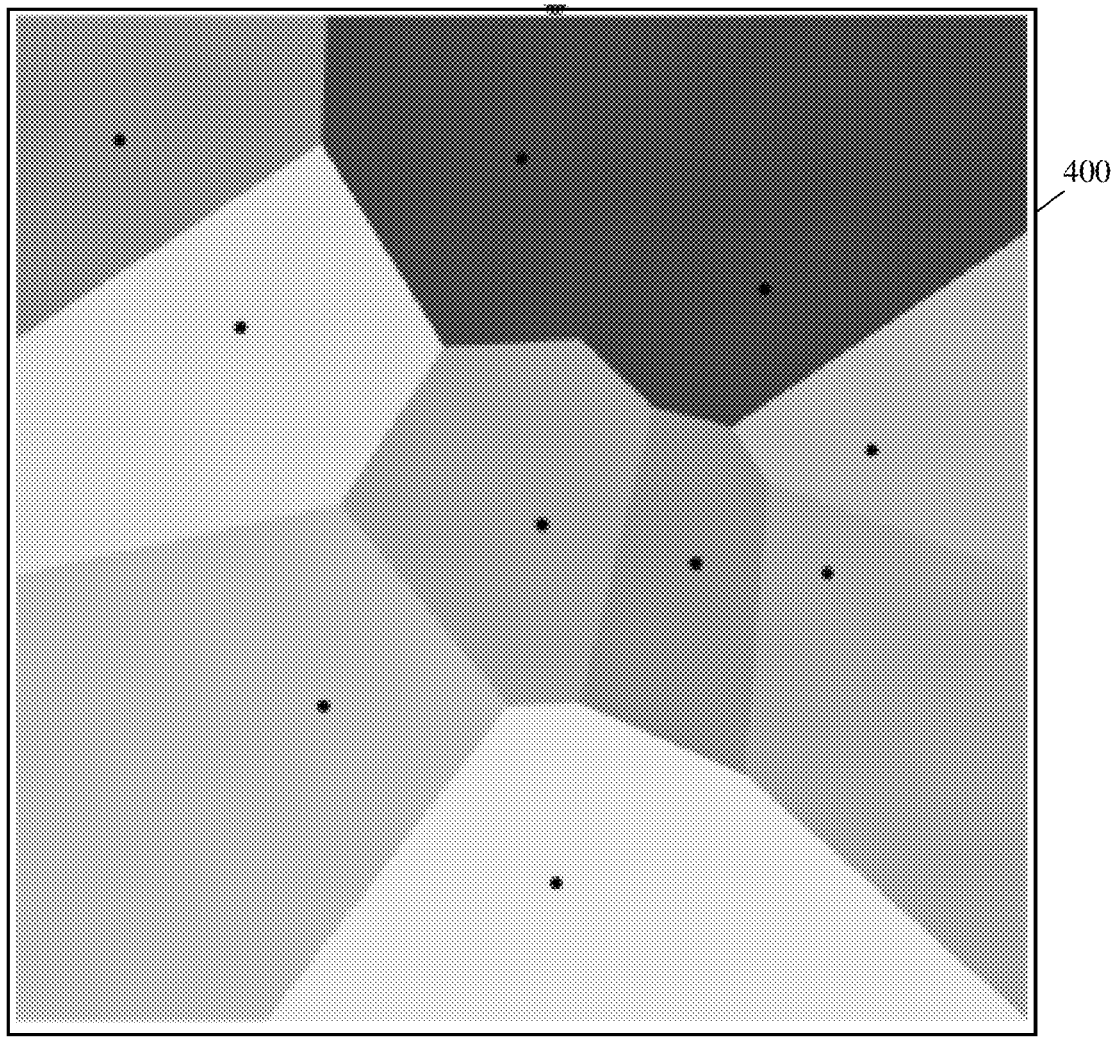
FIG. 4 is an exemplary Voronoi tessellation generated from seed values and including partitions that each correspond to a storage device.

Referring to FIG. 4, an exemplary Voronoi tessellation 400 generated from seed values and including partitions that are each assigned to one of the SSDs 206(1)-206(n) is illustrated. In this example, the dots represent the seed values from which the associated partitions are generated. Since the partitions of the Voronoi tessellation 400 can be expressed as a list of seed values, the synchronization complexity in a distributed system can be reduced, as described and illustrated in more detail below. Additionally, mapping a given arbitrary coordinate requires limited computational resources, is repeatable, and is efficiently computable. Further, partitions can be changed by adding, removing, or moving the locations of a seed, which can enlarge or reduce the size of partitions, and it is efficient to compute which regions have moved from one partition to another when seed(s) are moved, also as described and illustrated in more detail below.

Referring back to FIG. 3, in step 304, the NIC processor 210 of the host computing device 102(1) determines whether a storage operation has been received, such as from one of the client devices 110(1)-110(n), for example, although storage operations can be received from other entities in the storage network environment 100 in other examples. In order to illustrate some exemplary operations of this technology, accelerating write requests, read requests, and delete requests is described and illustrated by way of the examples herein, although other types of storage operations can also be received in step 304 and/or accelerated based on the hardware configuration of this technology in other examples. Accordingly, if the host computing device 102(1) determines that a storage operation has been received, then the Yes branch is taken to step 306.

In step 306, the NIC processor 210 of the host computing device 102(1) determines whether the storage operation is a write request, such as based on a type, header, and/or one or more other attributes of the storage operation, for example. If the host computing device 102(1) determines that the storage operation is a write request, then the Yes branch is taken and the host computing devices 102(1) begins servicing the write request at step 500 of FIG. 5A.

Figure 5A:
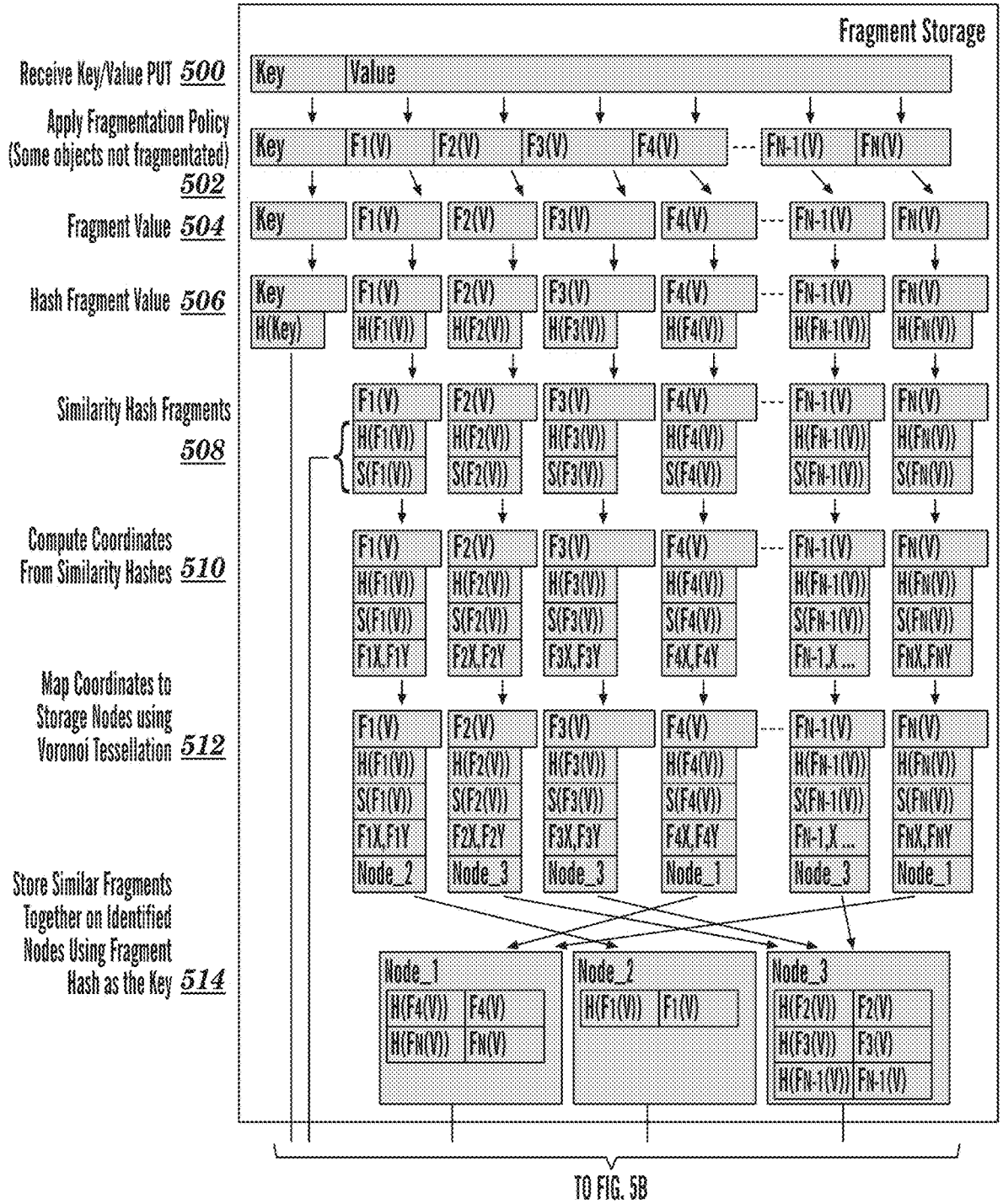
FIGS. 5A-5D are flowcharts of an exemplary method for servicing write requests using computational network and storage components.

Accordingly, referring to FIGS. 5A-5D, flowcharts of an exemplary method for servicing write requests using computational network and storage components are illustrated. Referring specifically to FIG. 5A, in step 500, the NIC processor 210 of the host computing device 102(1) receives a key/value pair along with the write request, which is referred to as a PUT operation in FIG. 5A. The key can be a file name or other unique identifier of the file or object to be written or modified as part of the write request. The value is the content to be written in this example, although other types of keys, values, and/or other content can also be retrieved from the write request in other examples.

In step 502, the NIC processor 210 of the host computing device 102(1) applies a fragmentation policy to fragment the value associated with the received write request. In one example, the NIC processor 210 optionally applies the fragmentation policy only when a size of the value is determined to be greater than a PCIe transaction layer packet (TLP) size and, otherwise, the NIC processor 210 does not fragment the value. Other types of fragmentation policies that define which values are fragmented can also be used, such as fixed-sized fragmentation, variable-sized fragmentation, content-aware fragmentation or identity fragmentation. In the particular example illustrated in FIG. 5A, the fragmentation policy determines that the value should be fragmented and, accordingly, the NIC processor 210 proceeds to step 504.

In step 504, the NIC processor 210 of the host computing device 102(1) fragments the value extracted from the write request. The NIC processor 210 can apply a content-aware variable length fragmentation algorithm optimized for deduplication to implement the fragmentation, for example, although other types of fragmentation algorithms can also be used. In examples in which the NIC processor 210 is a microprocessor, the fragmentation can optionally be performed more efficiently by a configurable hardware logic device (e.g., FPGA) of the NIC(s) 204 to facilitate greater acceleration of the write request.

In step 506, the NIC processor 210 of the host computing device 102(1) hashes each of the fragments to generate a fragment value hash for each of the fragments. The fragment value hash is generated based on the content of the associated fragment, or portion of the extracted value associated with the fragment, for example, although only a portion of the content and/or other data can also be used in other examples. Additionally, the host computing device 102(1) hashes the key extracted from the write request to generate a key hash, which is used as described and illustrated in more detail below with reference to FIG. 5B. Any traditional hashing algorithm can be used to generate the fragment value and key hashes in step 506.

In step 508, the NIC processor 210 of the host computing device 102(1) hashes each of the fragments to generate a fragment similarity hash for each of the fragments. The fragment similarity hash can also be generated based on the content of the associated fragment, for example, although only a portion of the content and/or other data can also be used in other examples. The hashing algorithm used in step 508 can be capable of generating similar hashes for similar content, although other types of hashing algorithms can also be used.

In step 510, the NIC processor 210 of the host computing device 102(1) determines coordinates for each of the fragments within the Voronoi tessellation generated as described and illustrated above with reference to step 300 of FIG. 3. The coordinates can be determined based on the fragment similarity hashes generated in step 508, for example, although the coordinates can be based on other data in other examples.

In step 512, the NIC processor 210 of the host computing device 102(1) maps each of the coordinates determined in step 510 to one of the SSDs 206(1)-206(n) using the Voronoi tessellation and the assignment of the SSDs 206(1)-206(n) generated as described and illustrated above with reference to step 302 of FIG. 3. Accordingly, the NIC processor 210 identifies a partition of the Voronoi tessellation, and associated one of the SSDs 206(1)-206(n), in which each of the coordinates falls. While the SSDs 206(1)-206(n) are referred to as storage nodes in FIG. 5A, other types of storage nodes, devices, or entities can also be used.

In step 514, the NIC processor 210 of the host computing device 102(1) stores similar fragments together on the ones of the SSDs 206(1)-206(n) to which the coordinates were determined to map in step 512. To store the fragments, the NIC processor 210 sends at least the fragments and associated fragment value hashes to the storage processors 212(1)-212(n) of ones of the SSDs 206(1)-206(n) via TLPs and the PCIe system bus 208 in this example. Each of the storage processors 212(1)-212(n) of the recipient ones of the SSDs 206(1)-206(n) hosted by the host computing device 102(1) stores the received fragment value hash(es) as the key(s) and the fragment value(s) as the value(s) in key/value pairs in a local key/value store.

In order to facilitate automatic deduplication, in some examples, the storage processors 212(1)-212(n) of the host computing device 102(1) can determine whether any of the received fragments have the same fragment value hash as another fragment previously received and stored in the key/value store, in which case the content or value of the fragments is the same. If there is a match, only one fragment and associated fragment value hash is maintained in the key/value store to effectively deduplicate the content. Additionally, the fragment values are optionally compressed and/or encrypted by the storage processors 212(1)-212(n) upon receipt, or by the NIC processor 210 prior to being sent to the storage processors 212(1)-212(n).

Figure 5B:
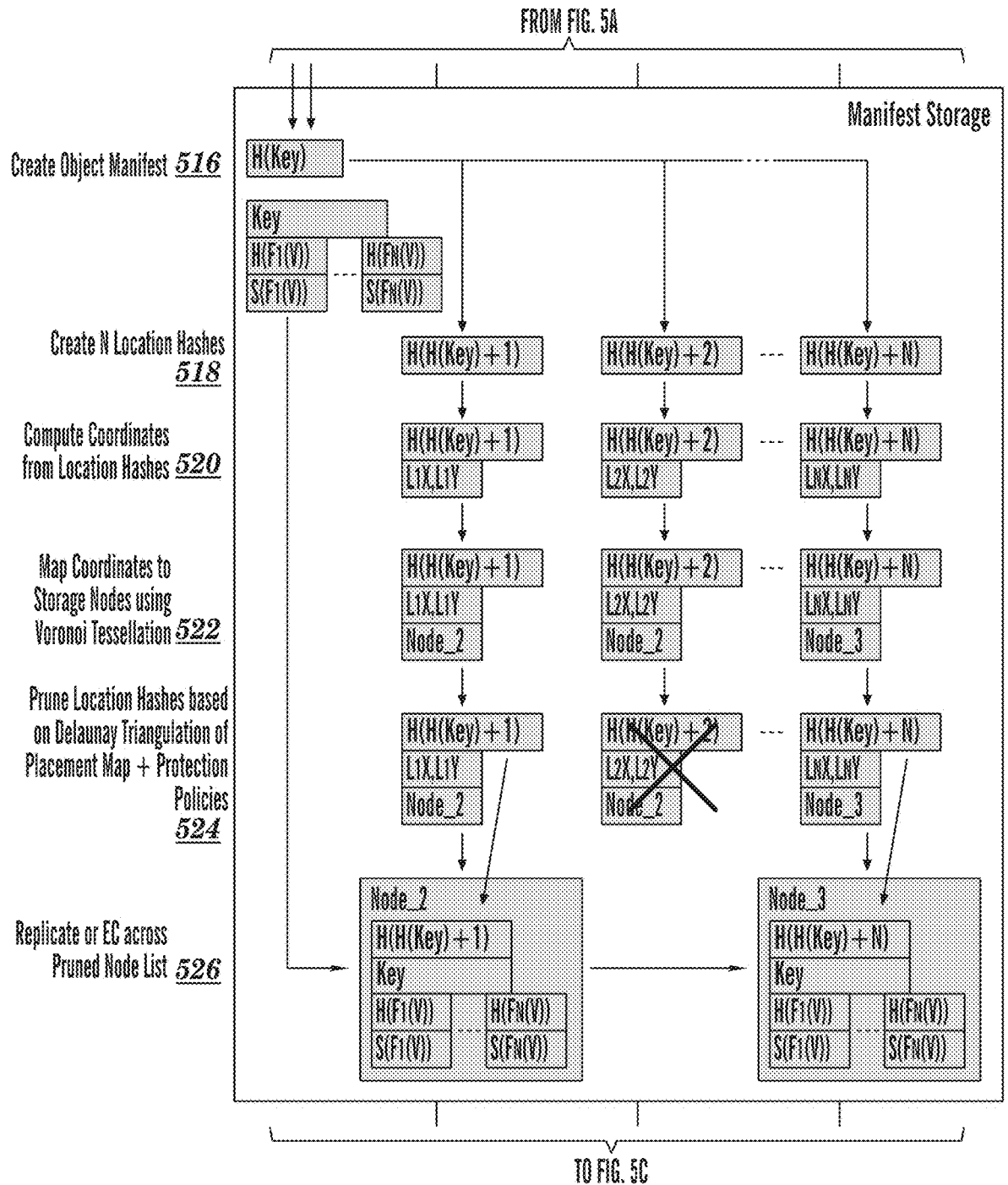

Referring specifically to FIG. 5B, in step 516, the NIC processor 210 of the host computing device 102(1) then creates an index, referred to in FIG. 5B as an object manifest. To create the object manifest, the NIC processor 210 aggregates the key extracted from the write request received in step 500, the key hash generated in step 506, and the similarity value hashes and fragment value hashes for each of the fragments generated in step 502.

In step 518, the NIC processor 210 of the host computing device 102(1) generates location hashes. In this example, the key extracted from the write request is incremented and hashed to create the location hashes. Optionally, the number of location hashes can be the same as the number of SSDs 206(1)-206(n) and partitions in the Voronoi tessellation, although a different number of one or more of the location hashes and/or partitions can also be used. In particular, multiple of the SSDs 206(1)-206(n) can be associated with the same partition within the Voronoi tessellation, one or more partitions in the Voronoi tessellation may not be associated with any of the SSDs 206(1)-206(n), and other permutations can also be used.

In steps 520, the NIC processor 210 of the host computing device 102(1) determines coordinates within the Voronoi tessellation from the location hashes, as described and illustrated above with reference to step 510 and with respect to the similarity value hashes. Accordingly, the NIC processor 210 determines the partitions of the Voronoi tessellation in which the determined coordinates fall.

In step 522, the NIC processor 210 of the host computing device 102(1) maps the coordinates to the SSDs 206(1)-206(n), as described and illustrated above with reference to step 512, for example. The mapping in step 522 is based on the correspondence of the SSDs 206(1)-206(n) with the partitions of the Voronoi tessellation identified in step 520.

In step 524, the NIC processor 210 of the host computing device 102(1) prunes the location hashes, optionally based on a Delaunay Triangulation of a placement set or map and a data protection policy. The placement set can be determined based on the subset of the SSDs 206(1)-206(n) mapped in step 522. In the particular example illustrated in FIG. 5B, the pruning in step 524 results in the dropping of one of the location hashes having associated coordinates mapped to the same one of the SSDs 206(1)-206(n) (referred to in FIG. 5B as Node_2), although other types of pruning or other processing of the location hashes can be performed by the NIC processor 210 in step 524 in other examples.

In step 526, the NIC processor 210 of the host computing device 102(1) optionally replicates or erasure codes the object manifest generated in step 516 across those of the SSDs 206(1)-206(n) to which the coordinates were determined to match in step 522 and that were not associated with a location hash pruned in step 524 (referred to in FIG. 5B as Node_2 and Node_3). The object manifest can be used to retrieve data in response to a read request, as described and illustrated in more detail below with reference to FIG. 6A.

Figure 5C:
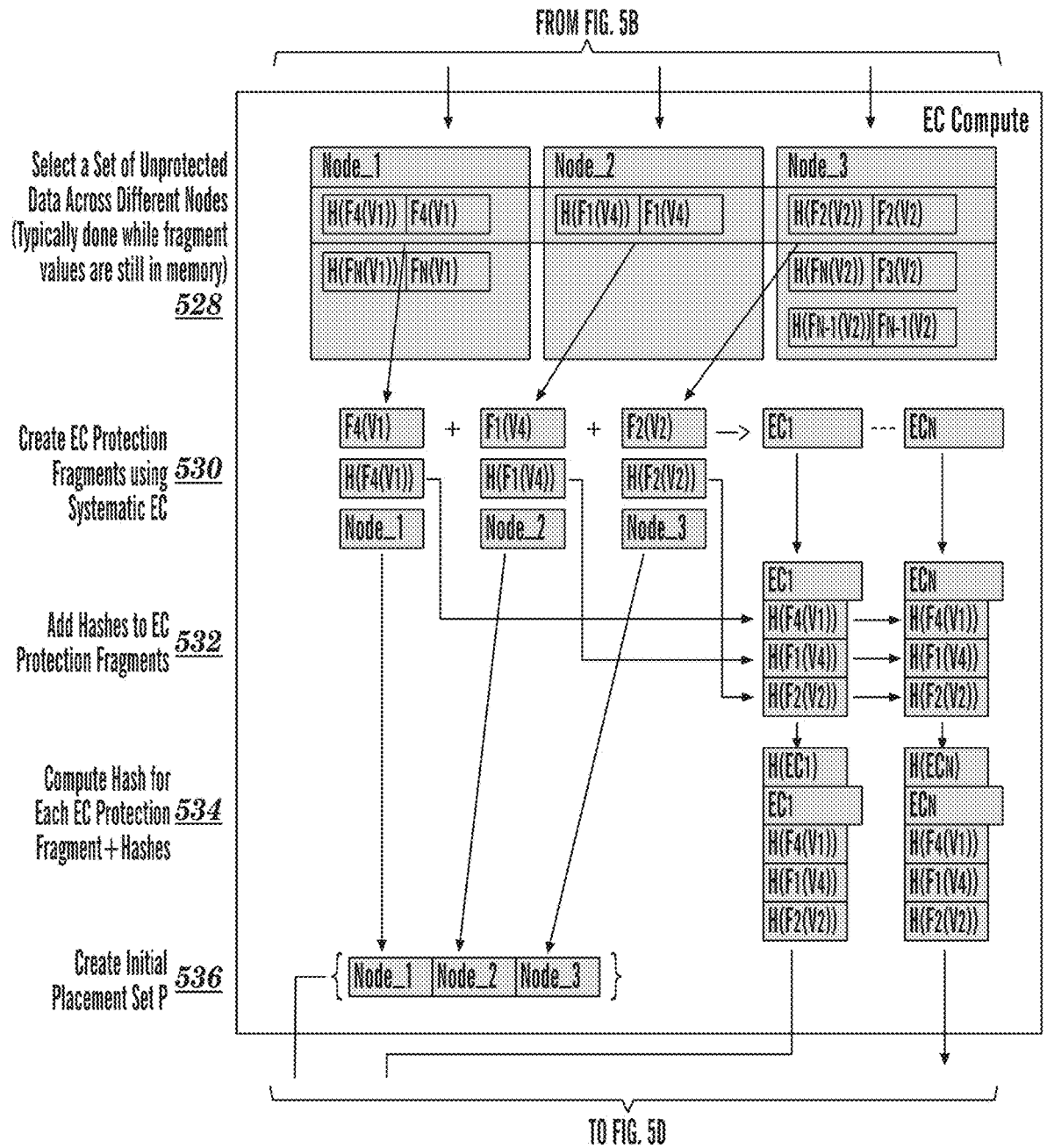

Referring specifically to FIG. 5C, in step 528, the NIC processor 210 of the host computing device 102(1) selects a set of unprotected data across different ones of the SSDs 206(1)-206(n). The data is unprotected in this example when a data protection policy has not been applied to the data. In this particular example, unprotected data has not yet been erasure coded, but may be persistently stored or replicated locally or across multiple nodes until such time as it is protected by an applicable data protection policy. Optionally, the set of unprotected data can be a subset of the fragment values generated as part of processing a write request, as described and illustrated above with reference to step 504, for example. The selection in step 528 can be of the fragment value and the corresponding fragment value hash for each portion of the unprotected data. Also optionally, the fragments are selected such that their fragment similarity hashes are as different as possible, although other criteria for selecting the unprotected data can also be used.

In step 530, the NIC processor 210 of the host computing device 102(1) generates protection fragments for the selected set of unprotected data using a systemic erasure coding algorithm. As the fragments of the selected unprotected data can be different lengths, to generate the protection fragments using a systematic erasure coding algorithm, each of the fragments can be virtually zero padded out to the length of the longest of the fragments, which will generate two protection fragments that are equal in length to the longest of the fragments. Other methods for generating the protection fragments can also be used in other examples.

In step 532, the NIC processor 210 of the host computing device 102(1) adds the fragment value hashes of each of the fragments to each of the protection fragments. The added fragment value hashes are associated with each of the fragments of the unprotected data selected in step 528 in this example.

In step 534, the NIC processor 210 of the host computing device 102(1) generates a protection fragment hash for each of the aggregated protection fragments and fragment value hashes. The protection fragment hash, protection fragment, and fragment value hashes are subsequently stored as described and illustrated in more detail below with reference to FIG. 5D.

In step 536, the NIC processor 210 of the host computing device 102(1) generates an initial placement set. The initial placement set in this example includes an indication of each of the SSDs 206(1)-206(n) from which a fragment was selected as part of the set of unprotected data selected in step 528 (referred to as Node_1, Node_2, and Node_3 in FIG. 5C), although other methods for generating the initial placement set can also be used in other examples.

Figure 5D:
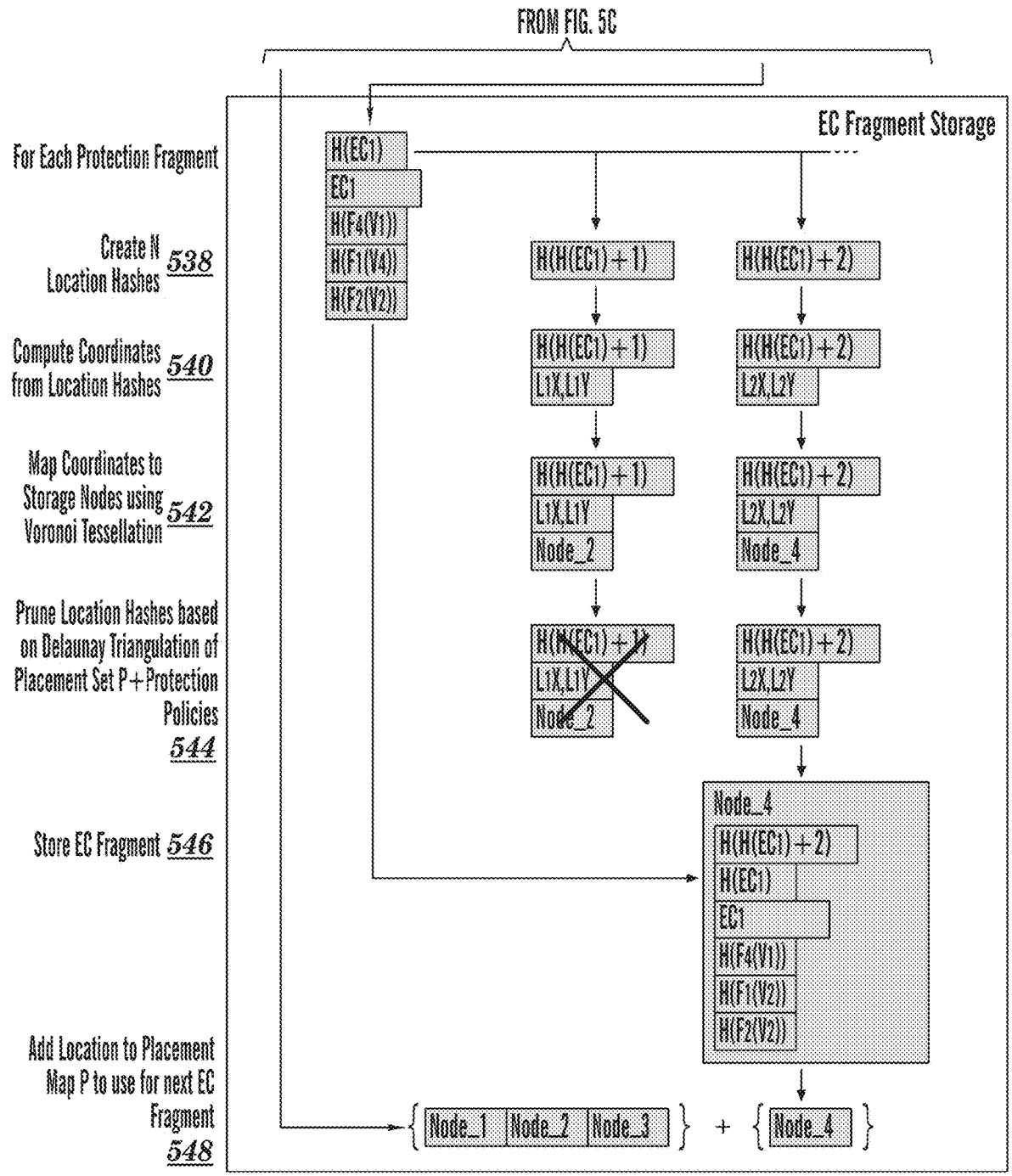

Referring specifically to FIG. 5D, in step 538, the NIC processor 210 of the host computing device 102(1) generates location hashes for each of the protection fragments generated in step 530. The location hashes can be generated as described and illustrated in more detail above with reference to step 518 and with respect to the object manifest, for example.

In step 540, the NIC processor 210 of the host computing device 102(1) generates coordinates within the Voronoi tessellation, generated as described and illustrated above with reference to step 300 of FIG. 3, from the location hashes. The coordinates can be generated as described and illustrated in more detail above with reference to step 522 and with respect to the location hashes generated from the object manifest, for example.

In step 542, the NIC processor 210 of the host computing device 102(1) maps the generated coordinates to the SSDs 206(1)-206(n) based on the assignment of the partitions within which the generated coordinates fall to the SSDs 206(1)-206(n) described and illustrated above with reference to step 302 of FIG. 3. Accordingly, the mapping can also be performed as described and illustrated in more detail above with reference to step 522, for example.

In step 544, the NIC processor 210 of the host computing device 102(1) prunes the location hashes optionally based on a Delaunay Triangulation of the initial placement set generated in step 536 and one or more data protection policies, for example, although the pruning can be performed in other ways in other examples. In the particular example illustrated in FIG. 5D, the pruning in step 544 results in the dropping of one of the location hashes having associated coordinates mapped to the one of the SSDs 206(1)-206(n) (referred to as Node_2 in the example illustrated in FIG. 5D), although other types of pruning or other processing of the location hashes can be performed by the NIC processor 210 in step 524.

In step 546, the NIC processor 210 of the host computing device 102(1) stores the protection fragment. The protection fragment can be stored based on the remaining one of the SSDs 206(1)-206(n) to which coordinates were determined to match in step 542 and that were not associated with a location hash pruned in step 544 (referred to as Node_4 in the example illustrated in FIG. 5D)

In step 548, the NIC processor 210 of the host computing device 102(1) adds a location to the initial placement set. The added location corresponds to the one of the SSDs 206(1)-206(n) at which the protection fragment was stored in step 546 (referred to as Node_4 in the example illustrated in FIG. 5D). Accordingly, the initial placement set is the set of nodes that the fragments used to create the EC protection fragments are stored. Steps 538-548 are then repeated by the NIC processor 210 for each of the protection fragments generated as described and illustrated above with reference to step 530.

Referring back to FIG. 3, if the NIC processor 210 of the host computing device 102(1) determines in step 306 that the received storage operation is not a write request, then the No branch is taken to step 308. In step 308, the NIC processor 210 of the host computing device 102(1) determines whether the received storage operation is a read request, such as based on headers, content, or other attributes or parameters of the storage operation, for example. If the host computing device 102(1) determines that the received storage operation is a read request, then the host computing device 102(1) proceeds to service the read request at step 600 of FIG. 6A.

Figure 6A:
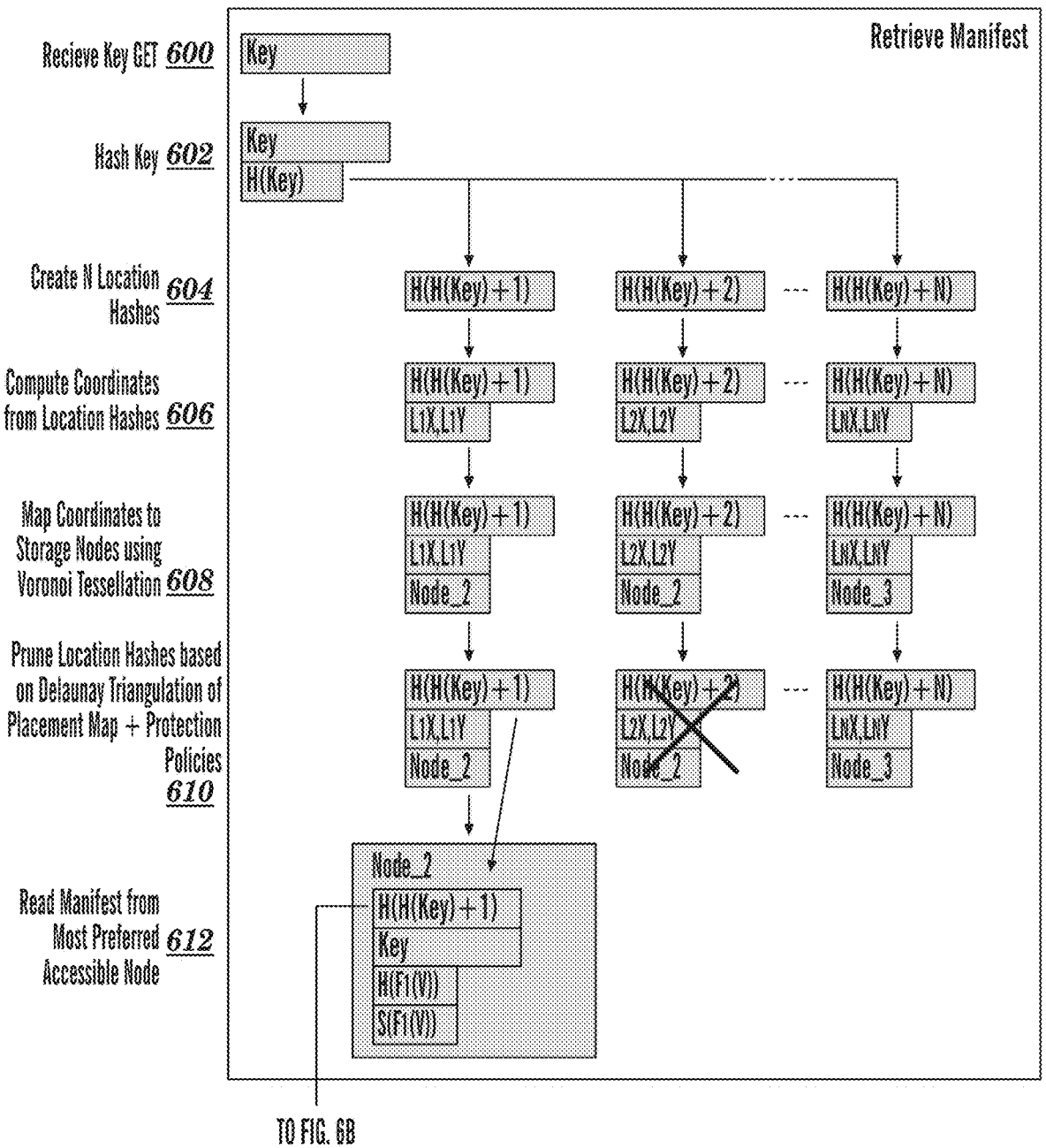
FIGS. 6A-6B are flowcharts of an exemplary method for servicing read requests using computational network and storage components.
Figure 6B:
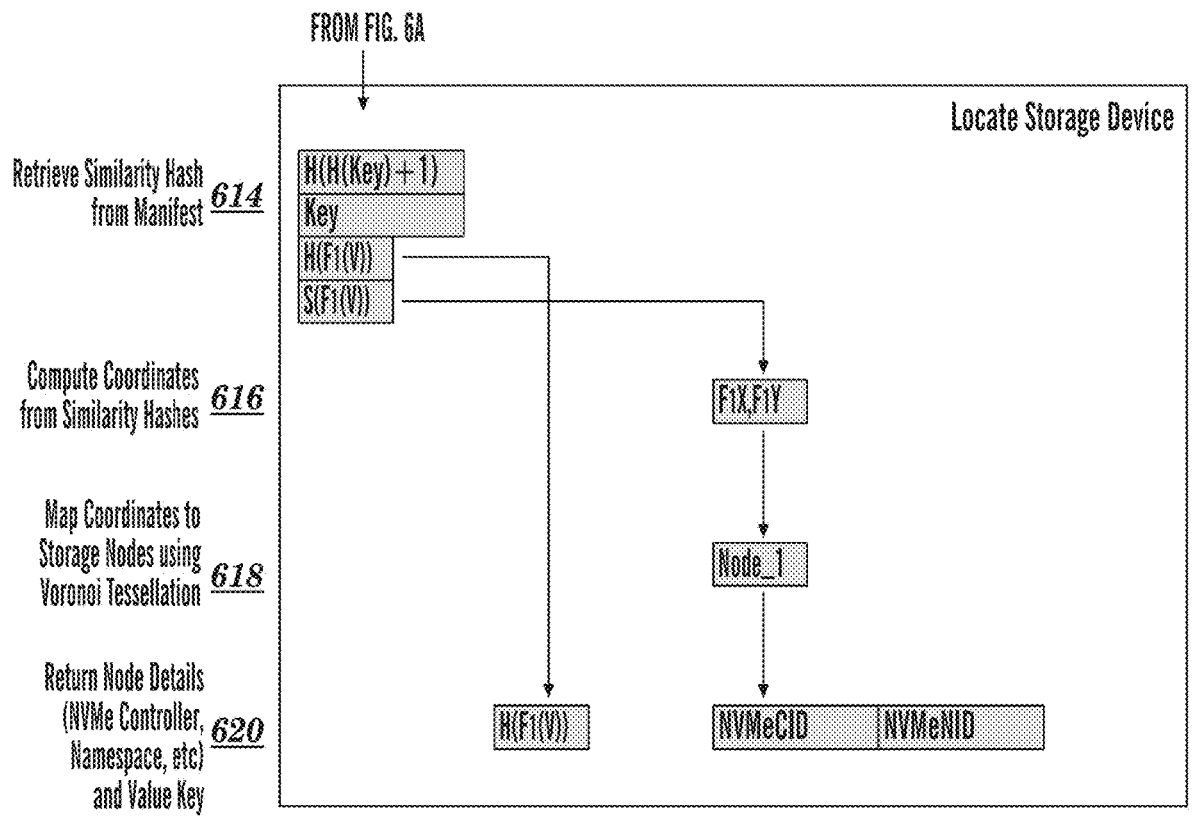

Accordingly, referring to FIGS. 6A-6B, flowcharts of an exemplary method for servicing read requests using computational network and storage components are illustrated. In step 600, the NIC processor 210 of the host computing device 102(1) extract a key from the received read request, which is referred to as a GET storage operation in FIG. 6A. As described above, the key can be a file name or other unique object identifier, for example.

In step 602, the NIC processor 210 of the host computing device 102(1) generates a key hash from the key. The key hash is generated in this example using the same hashing algorithm that was used by the NIC processor 210 to generate the key hash in step 506.

In step 604, the NIC processor 210 of the host computing device 102(1) generates location hashes. In this example, the key extracted from the write request is incremented and hashed to create the location hashes. Optionally, the number of location hashes can be the same as the number of SSDs 206(1)-206(n) and partitions in the Voronoi tessellation, although a different number of one or more of the location hashes and/or partitions can also be used.

In step 606, the NIC processor 210 of the host computing device 102(1) determines coordinates from the location hashes generated in step 604. The coordinates are within the n-dimensional space associated with the Voronoi tessellation generated as described and illustrated above with reference to step 400 of FIG. 3 and FIG. 4.

In step 608, the NIC processor 210 of the host computing device 102(1) maps the coordinates determined in step 606 to the SSDs 206(1)-206(n) using the Voronoi tessellation. In particular, the host computing device 102(1) determines the partitions of the Voronoi tessellation in which the coordinates fall and then identifies those of the SSDs 206(1)-206 (n) assigned to the partitions as described and illustrated earlier with reference to step 302 of FIG. 3.

In step 610, the NIC processor 210 of the host computing device 102(1) prunes the location hashes, optionally based on a Delaunay Triangulation of a placement set or map and a data protection policy. The placement set can be determined based on the subset of the SSDs 206(1)-206(n) mapped in step 608. In the particular example illustrated in FIG. 6A, the pruning in step 610 results in the dropping of one of the location hashes having associated coordinates mapped to the same one of the SSDs 206(1)-206(n) (referred to in FIG. 6A as Node_2), although other types of pruning or other processing of the location hashes can be performed by the NIC processor 210 in step 610 in other examples.

In step 612, the NIC processor 210 of the host computing device 102(1) reads the object manifest from a most preferred one of the accessible subset of the SSDs 206(1)-206 (n) mapped in step 608 and not dropped as a result of the location hash pruning in step 610. The object manifest was replicated to each of the subset of the SSDs 206(1)-206(n) in step 526 of FIG. 5B in this example, although the object manifest could have been stored in other manners.

Referring specifically to FIG. 6B, in step 614, the NIC processor 210 of the host computing device 102(1) extracts a fragment similarity hash from the object manifest retrieved in step 612. The fragment similarity hashes were created in step 508 of FIG. 5A and included in the object manifest in step 516 of FIG. 5B, for example.

In step 616, the NIC processor 210 of the host computing device 102(1) determines coordinates within the Voronoi tessellation generated in step 300 of FIG. 3 based on the extracted similarity hash. Optionally, the coordinates can be determined in the same manner as described and illustrated in more detail earlier with reference to step 510 of FIG. 5A, for example.

In step 618, the NIC processor 210 of the host computing device 102(1) maps the coordinates determined in step 616 to one of the SSDs 206(1)-206(n). The mapping in this example is based on one of the partitions of the Voronoi tessellation in which the determined coordinates falls and the assignment of the SSDs 206(1)-206(n) to the partitions in step 302 of FIG. 3, for example.

In step 620, the NIC processor 210 of the host computing device 102(1) uses TLP exchanges with one of the storage processors 212(1)-212(n) associated with the one of the SSDs 206(1)-206(n) to which the coordinates were mapped in step 618 to retrieve a fragment. In particular, the NIC processor 210 extracts a fragment value hash from the object manifest retrieved in step 612 of FIG. 6A and sends the extracted fragment value hash to the one of the storage processors 212(1)-212(n).

The one of the storage processors 212(1)-212(n) then looks up the fragment value hash in its local key/value store. The fragment value hash is a key in the key/value store associated with a fragment value and the key/value pair would have been stored as described and illustrated in more detail earlier with reference to step 514 of FIG. 5A, for example. In this example, steps 616-620 are repeated for each of the fragment similarity hashes in the object manifest retrieved in step 614. Optionally, each of the fragment can be decrypted and/or decompressed and the plaintext fragments are then reassembled by the NIC 210 into a range or full value stream for delivery to a requesting one of the client devices 110(1)-110(n).

In some examples, if the one of the storage processors 212(1)-212(n) does not find the requested fragment because it was lost, for example, it can increment the fragment value hash and try to obtain a replacement from the next one of the SSDs 206(1)-206(n). Additionally, if the corresponding one of the SSDs 206(1)-206(n) is not available because it failed, for example, the NIC processor 210 can increment the fragment value hash and try to obtain a replacement from the next one of the SSDs 206(1)-206(n) and/or retrieve the protection fragments, which were stored as described and illustrated above with reference to step 546 of FIG. 5D. Accordingly, the protection fragments can be used to reconstruct missing data, but the erasure coding processing is advantageously not required unless data is missing.

Such single object repair follows the same flow as the read request processing described and illustrated with reference to FIGS. 6A-6B, with the missing fragment(s) reconstructed using protection fragments and stored following the same flow as the write request processing described and illustrated with reference to FIGS. 5A-5D. Accordingly, if a missing fragment is identified during processing of a read request, it is reconstructed using the protection fragments, and stored following the same flow as the write request processing described and illustrated with reference to FIGS. 5A-5D. If any protection fragments have been lost, they are also rebuilt following the same flow as the write request processing described and illustrated with reference to FIGS. 5A-5D.

Newly reconstructed fragments are stored according to the latest Voronoi tessellation, and existing fragments are rebalanced over time to adjust to the change in the tessellation, which can occur as described and illustrated in more detail below. Low latency access to the protection fragments associated with a key's fragments outside of a bulk map-reduce is accomplished by either maintaining a separate index or by deferring manifest storage until after erasure coding, and adding the protection fragment hashes.

Referring back to FIG. 3, if the NIC processor 210 of the host computing device 102(1) determines in step 308 that the storage operation received in step 304 is not a read request, then the No branch is taken to step 310. In this example, if the received storage operation is not a write request or a read request, then the received storage operation is a delete request, although other types of storage operations can be received in other examples.

In step 310, the NIC processor 210 of the host computing device 102(1) retrieves and deletes an index and one or more of the storage processors 212(1)-212(n) subsequently identifies and deletes key/value pair(s) for fragments that are not referenced by an index (e.g., the deleted index) in order to service the delete request. In this example, the index or object manifest is retrieved as described and illustrated above with reference to steps 600-612 of FIG. 6A, with the key being extracted by the NIC processor 210 from the delete request and used to locate the object manifest.

Optionally, as a background process, each of the storage processors 212(1)-212(n) can identify all indexes and build a distributed list of all fragments. Since the "owner" for each fragment is efficiently identifiable using the Voronoi tessellation, the generation of the distributed list is relatively efficient and can be performed in a streaming process, for example. With the distributed list, the storage processors 212(1)-212(n) can identify and delete, from the respective local key/value stores, those key/value pairs that do not reference from a current or active index (e.g., as a result of the prior deletion of the index by the NIC processor 210).

Subsequent to servicing the delete request in step 310, or if the NIC processor 210 of the host computing device 102(1) determines in step 304 that a storage operation has not been received and the No branch is taken, then the host computing device 102(1) proceeds to step 312. In step 312, the host computing device 102(1) determines whether a rebuild has been initiated or is otherwise require, such as due to a failure of one of the SSDs 206(1)-206(n), for example. If the host computing device 102(1) determines that a rebuild is required, then the Yes branch is taken and the host computing device proceeds to rebuild a lost one of the SSDs 206(1)-206(n) in step 700 of FIG. 7A.

Figure 7A:
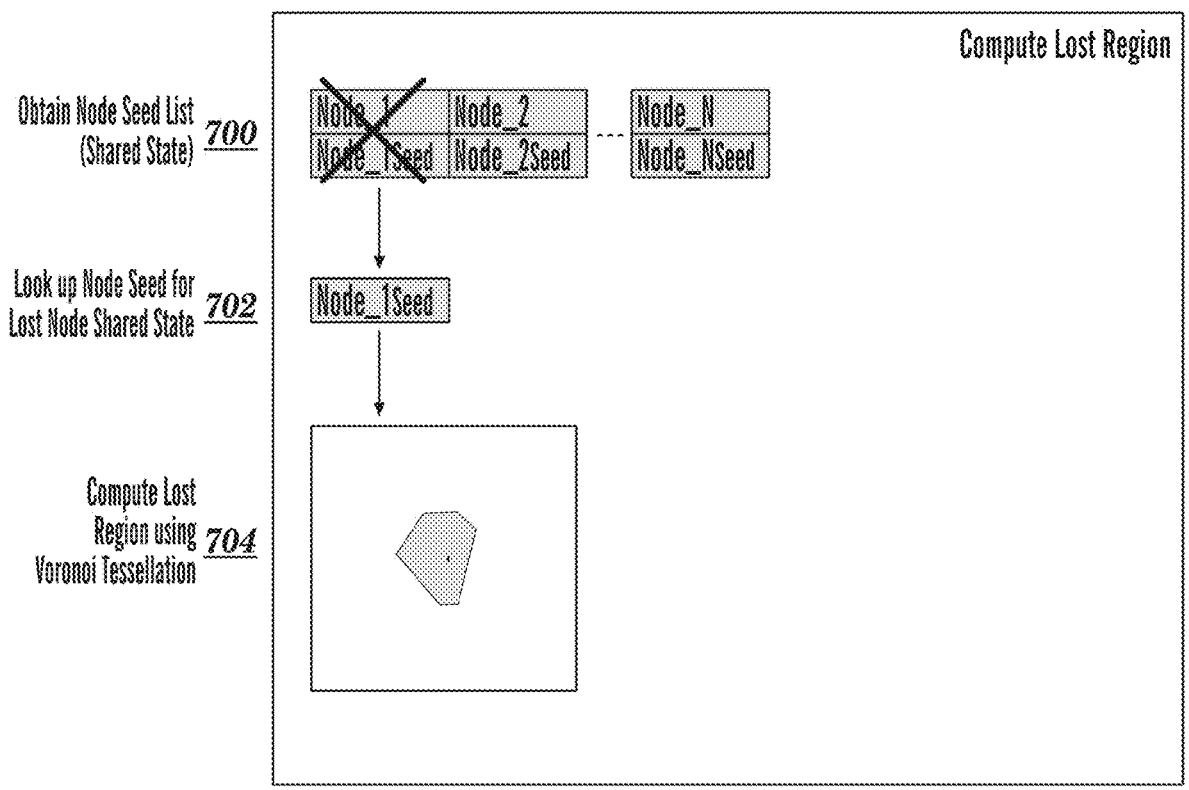
FIGS. 7A-7C are flowcharts of an exemplary method for rebuilding after loss of a node in a storage network environment.
Figure 7B:
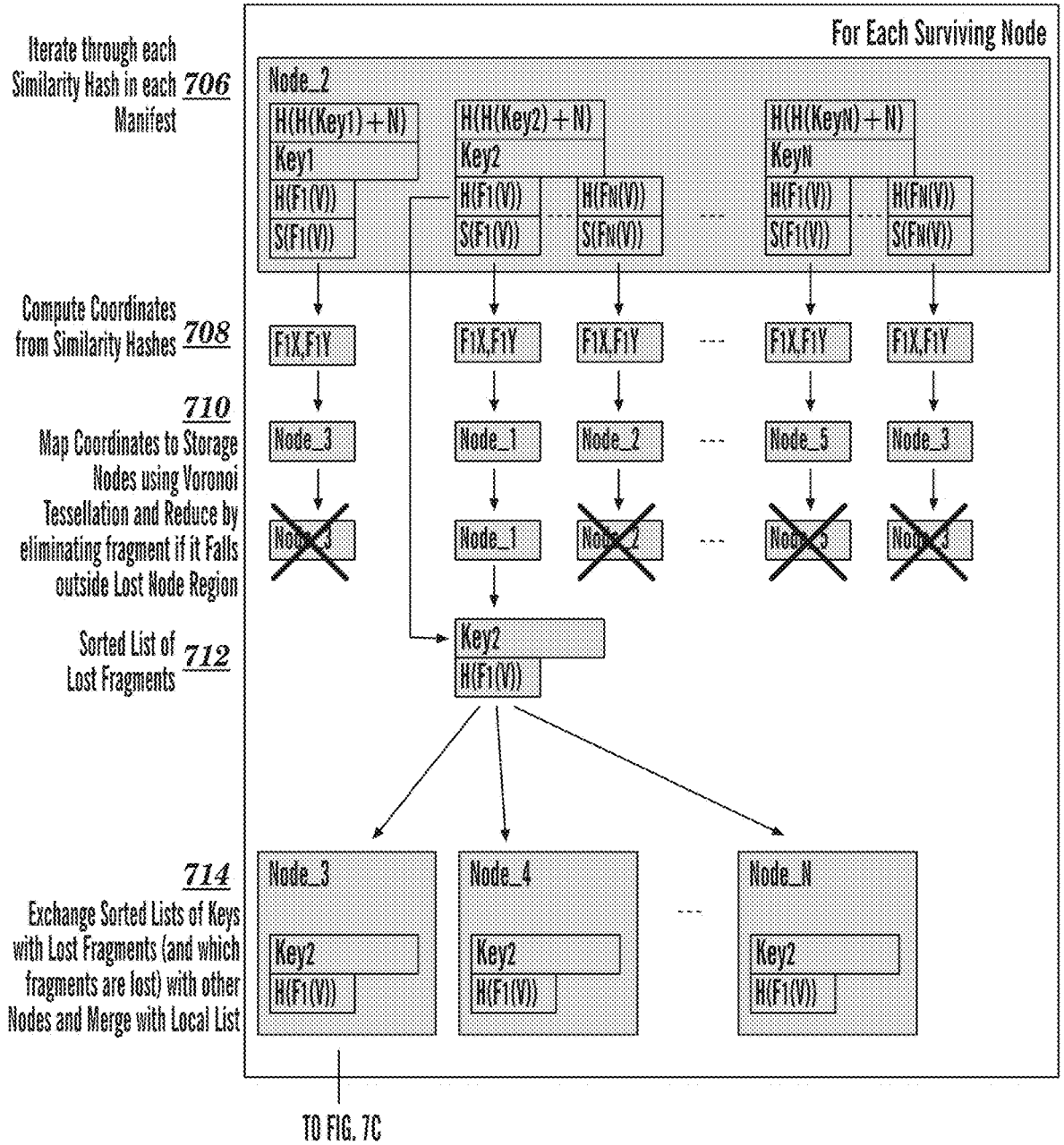
Figure 7C:
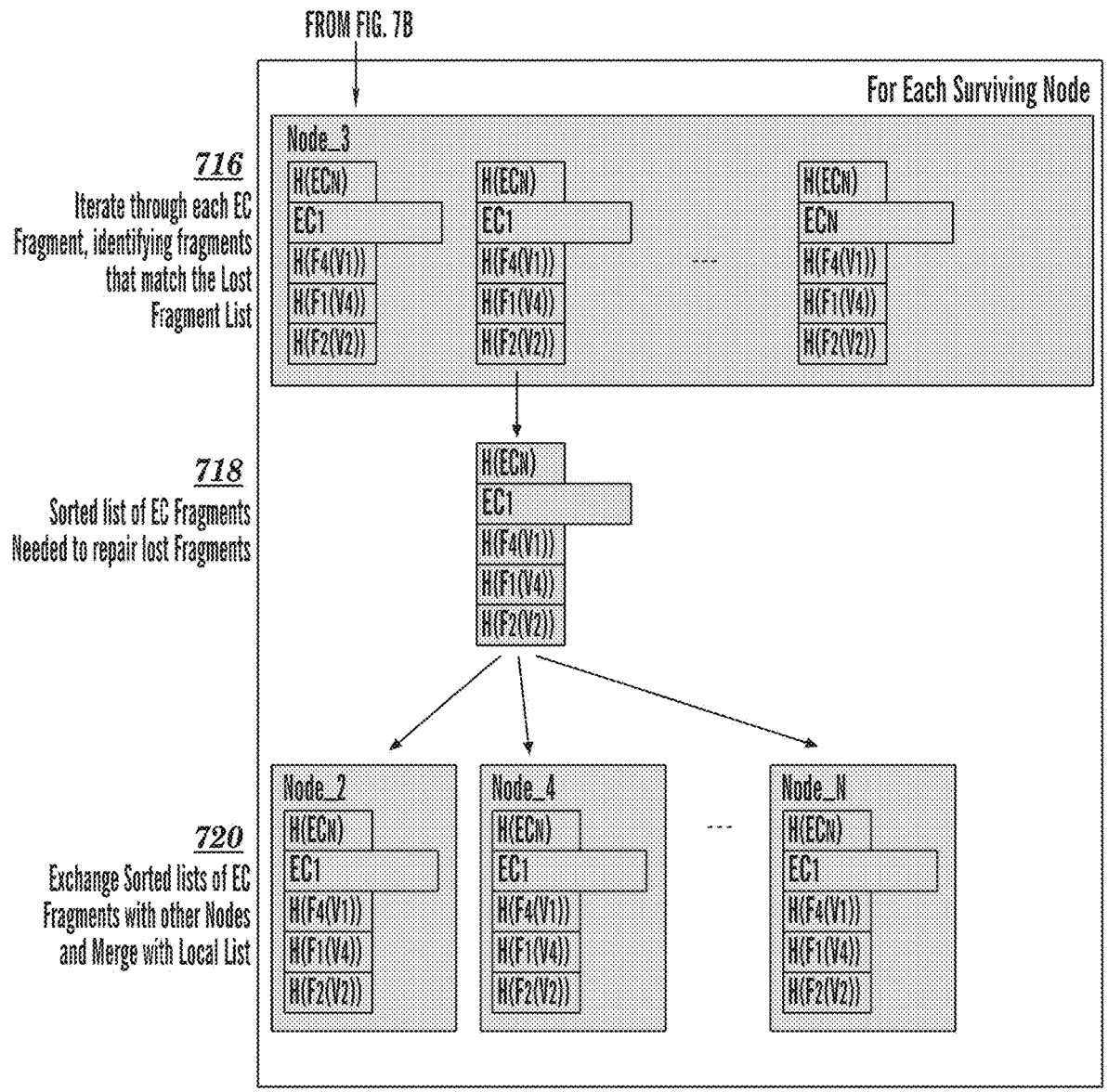

Accordingly, referring to FIGS. 7A-7C, flowcharts of an exemplary method for rebuilding after loss of a node in a storage network environment are illustrated. In this example, if one of the SSDs 206(1)-206(n) fails those of the storage processors 212(1)-212(n) associated with those of the SSDs 206(1)-206(n) that have not failed identify, in parallel, all indexes that have fragments that map to the failed one of the SSDs 206(1)-206(n) via the Voronoi tessellation generated as described and illustrated above with reference to step 300 of FIG. 3, which results in a distributed rebuild list. When the failed one of the SSDs 206(1)-206(n) is replaced, it can be rebuilt. If the failed one of the SSDs 206(1)-206(n) is not replaced, the data can be rebuilt across other of the SSDs 206(1)-206(n), which requires rebuilding each missing fragment, and storing it on a different one of the SSDs 206(1)-206(n) by incrementing the fragment value hash.

Referring specifically to FIG. 7A, in step 700, each of the storage processors 212(1)-212(n) associated with a surviving one of the SSDs 206(1)-206(n) of the host computing device 102(1) obtains a node seed list, which includes each of the seed values used to generate the Voronoi tessellation and could have been distributed by the NIC processor 210 as described and illustrated above with reference to step 300 of FIG. 3.

In step 702, each of the storage processors 212(1)-212(n) associated with a surviving one of the SSDs 206(1)-206(n) of the host computing device 102(1) identifies from the obtained node seed list one of the seed values corresponding to the failed one of the SSDs 206(1)-206(n). In this example, the node seed list includes a correspondence of each seed value with a unique identifier for an associated one of the SSDs 206(1)-206(n), which can be compared to an identifier for the failed one of the SSDs 206(1)-206(n) obtained as part of the determination that the one of the SSDs 206(1)-206(n) has failed.

In step 704, each of the storage processors 212(1)-212(n) associated with a surviving one of the SSDs 206(1)-206(n) of the host computing device 102(1) identifies one of the partitions of the Voronoi tessellation generated in step 300 of FIG. 3 that was assigned to the failed one of the SSDs 206(1)-206(n) in step 302 of FIG. 3. The identified partition is referred to as a lost region in FIG. 7A.

Referring to FIG. 7B, in step 706, each of the storage processors 212(1)-212(n) associated with a surviving one of the SSDs 206(1)-206(n) of the host computing device 102(1) iterates through each fragment similarity hash in each stored object manifest. The fragment similarity hashes could have been created as described and illustrated above with reference to step 508 of FIG. 5A, and/or included in the object manifests in step 516 of FIG. 5B, for example. The object manifests could have been stored as described and illustrated earlier with reference to step 526 of FIG. 5B.

In step 708, each of the storage processors 212(1)-212(n) associated with a surviving one of the SSDs 206(1)-206(n) of the host computing device 102(1) determines coordinates within the Voronoi tessellation based on each fragment similarity hash retrieved from the object manifest in step 706. The coordinates can be determined as described and illustrated earlier with reference to step 510 of FIG. 5A, for example.

In step 710, each of the storage processors 212(1)-212(n) associated with a surviving one of the SSDs 206(1)-206(n) of the host computing device 102(1) maps the determined coordinates to the SSDs 206(1)-206(n) based on the partition in which the coordinates fall and the assignment of the SSDs 206(1)-206(n) to the partitions in step 302 of FIG. 3. The coordinates can be mapped as described and illustrated earlier with reference to step 512 of FIG. 5A, for example. Each of the of the storage processors 212(1)-212(n) associated with a surviving one of the SSDs 206(1)-206(n) then eliminates the fragments associated with mapped ones of the coordinates that fall outside of the lost region assigned to the failed one of the SSDs 206(1)-206(n).

In step 712, each of the storage processors 212(1)-212(n) associated with a surviving one of the SSDs 206(1)-206(n) of the host computing device 102(1) generates a sorted list of lost fragments based on the fragments not eliminated in step 710. The sorted list of lost fragments can include the key and the fragment value hash extracted from the corresponding object manifest, although other types and/or another number of data can also be included in the entries of the sorted list of lost fragments. The list of lost fragments is sorted by key in this example, although other types of sorting can also be used for the list of lost fragments.

In step 714, each of the storage processors 212(1)-212(n) associated with a surviving one of the SSDs 206(1)-206(n) of the host computing device 102(1) exchanges the sorted list of lost fragments with each other of the storage processors 212(1)-212(n) associated with a surviving one of the SSDs 206(1)-206(n). Upon receipt, each of the storage processors 212(1)-212(n) associated with a surviving one of the SSDs 206(1)-206(n) merges received ones of the sorted list of lost fragments with its own local sorted list of lost fragments generated in step 712.

Referring to FIG. 7C, in step 716, each of the storage processors 212(1)-212(n) associated with a surviving one of the SSDs 206(1)-206(n) of the host computing device 102(1) iterates through each protection fragment stored locally to identify fragments that match fragments identified in the lost fragment list merged and generated in step 714. The protection fragments could have been stored as described and illustrated above with reference to step 546 of FIG. 5D, for example. To determine whether a protection fragment matches the lost fragment list, a comparison can be made between the fragment value hash for each lost fragment in the lost fragment list with the fragment value hash(es) that are part of the protection fragment.

In step 718, each of the storage processors 212(1)-212(n) associated with a surviving one of the SSDs 206(1)-206(n) of the host computing device 102(1) generates a sorted list of protection fragments that are needed to repair the lost fragments hosted by the failed one of the SSDs 206(1)-206(n). The list of protection fragments can include the protection fragments determined to match the lost fragment list in step 716. Additionally, the list of protection fragment can be sorted by protection fragment hashes, for example, although other methods for sorting the list of protection fragments can also be used.

In step 720, each of the storage processors 212(1)-212(n) associated with a surviving one of the SSDs 206(1)-206(n) of the host computing device 102(1) exchanges the sorted list of protection fragments generated in step 718 with each other of the storage processors 212(1)-212(n) associated with a surviving one of the SSDs 206(1)-206(n). Upon receipt, each of the storage processors 212(1)-212(n) associated with a surviving one of the SSDs 206(1)-206(n) merges received ones of the sorted list of protection fragments with its own local sorted list of protection fragments generated in step 718.

With the generated, merged list of protection fragments, the storage processors 212(1)-212(n) associated with a surviving one of the SSDs 206(1)-206(n) can rebuild the failed one of the SSDs 206(1)-206(n) or rebuild each of the lost fragments and store the lost fragments on a surviving one of the SSDs 206(1)-206(n). In one example, the failed one of the SSDs 206(1)-206(n) is rebooted or otherwise determined to be available, and the reconstructed fragments or objects are stored on the available one of the SSDs 206(1)-206(n). In another example in which the failed one of the SSDs 206(1)-206(n) is unavailable, the reconstructed fragments or objects can be returned to one of the storage processors 212(1)-212(n) or other storage entity that broadcast the repair request that initiated the rebuild, which optionally caches the reconstructed fragments or objects. Other actions can also be taken with respect to the reconstructed fragments or objects in other examples.

Referring back to FIG. 3, subsequent to rebuilding the lost or failed one of the SSDs 206(1)-206(n), or if the NIC processor 210 of the host computing device 102(1) determines in step 312 that a rebuild is not required and the No branch is taken, then the host computing device 102(1) proceeds to step 314. In step 314, the NIC processor 210 of the host computing device 102(1) determines whether a change of the SSD topology is required. A topology change can be required when one of the SSDs 206(1)-206(n) is added or removed or when a rebalancing is determined to be required such as because utilization has exceeded a threshold for one of the SSDs 206(1)-206(n), for example. If the host computing device 102(1) determines that a topology change is required, then the Yes branch is taken to step 316.

In step 316, one or more of the storage processors 212(1)-212(n) of the host computing device 102(1) generates a list of fragments and indexes that require migration and transfers corresponding objects. The topology change can optionally proceed as a background process in some examples. To effect a topology change, the storage location, or coordinates for seed value(s) in the n-dimensional space is change. For each change, a list of fragments and indexes that require migration from one of the SSDs 206(1)-206(n) to another of the SSDs 206(1)-206(n) can be determined by the storage processors 212(1)-212(n).

Accordingly, how a storage location or seed value is moved within the Voronoi tessellation, for example, determines the objects that are offloaded, onboarded, etc. for any particular one of the SSDs 206(1)-206(n). In some examples, each of the storage processors 212(1)-212(n) maintains a last and a current list of storage locations or seed values, which facilitates determination of a current and previous fragment similarity hashes in the event a storage operation is received while a topology change and/or associated object migration is current in progress. Advantageously, a topology change can be implemented in parallel by each of the storage processors 212(1)-212(n) and does not require changing any of the indexes or any complex synchronization.

More specifically, and with respect to adding a new one of the SSDs 206(1)-206(n), a new site or seed value is initially generated by the NIC processor 210, for example, for the new one of the SSDs 206(1)-206(n). The new seed value can be generated as described and illustrated above with reference to step 300 of FIG. 3, for example. The new seed is added to the node seed list, an associated partition is assigned to the new seed, optionally a revision count associated with the node seed list is incremented, and the updated node seed list is distributed to each of the storage processors 212(1)-212(n).

Then, each of the storage processors 212(1)-212(n) can generate, in parallel, and without further coordination, the partitions of the Voronoi tessellation that have changed as a result of the new seed value. Additionally, each of the storage processors 212(1)-212(n) can identify which changed partitions or portions thereof correspond to fragments it has stored locally in order to generate a list of fragments that are required to be migrated. Each of the storage processors 212(1)-212(n) can then independently migrate the fragments in the generated list to the corresponding destination one or more of the SSDs 206(1)-206(n) in parallel. If a fragment is not located in response to a read request due to the migration still being in progress, the previous revision of the node seed list can be used to redirect the read request to another of the storage processors 212(1)-212(n) associated with one of the SSDs 206(1)-206(n) on which the fragment is still stored.

In another example in which one of the SSDs 206(1)-206(n) is to be removed, the NIC processor 210 can remove the storage location or seed corresponding to the partition assigned to the one of the SSDs 206(1)-206(n) from the node seed list, optionally update the revision count, and distribute the updated node seed list to the storage processors 212(1)-212(n). The one of the storage processors 212(1)-212(n) associated with the one of the SSDs 206(1)-206(n) being removed then regenerates the Voronoi tessellation based on the updated node seed list, determines the partitions of the Voronoi tessellation to which fragments it has stored locally are to be migrated, and transfers the fragments accordingly. As with the addition of one of the SSDs 206(1)-206(n), a prior node seed list can be maintained and used to service a read request for a fragment not yet migrated.

Figure 8:
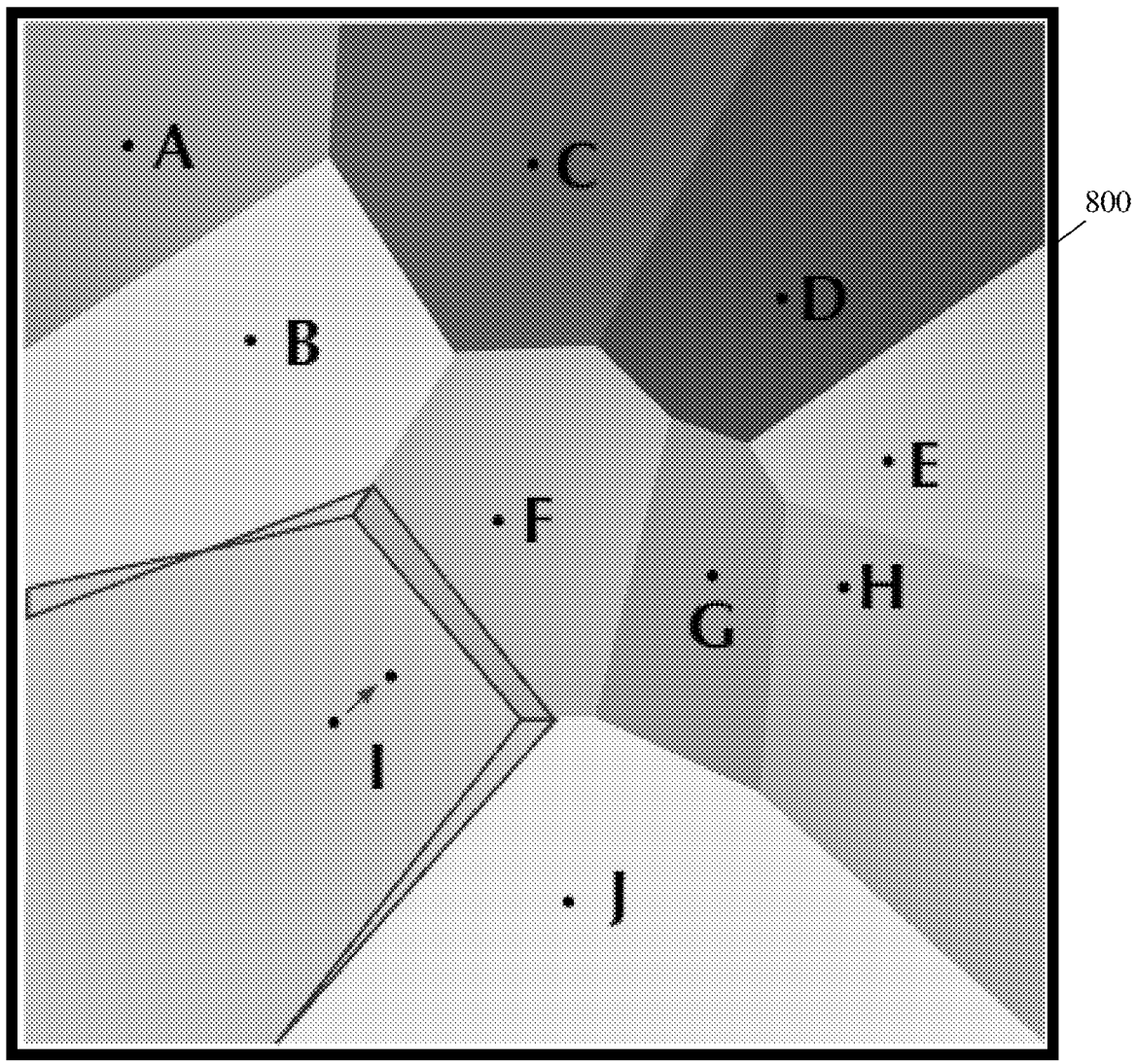
FIG. 8 is the exemplary Voronoi tessellation of FIG. 4 after a topology change.

In yet another example in which the topology is changed in order to rebalance the SSDs 206(1)-206(n), the node seed list is altered to effectuate the rebalancing Referring to FIG. 8, the exemplary Voronoi tessellation of FIG. 4 after a topology change is illustrated. In this example, the seed value within the partition I of the updated Voronoi tessellation 800 is moved, resulting in the alteration of the boundaries of that partition and impacting fragments stored on those of the SSDs 206(1)-206(n) assigned to partitions B, F, I, and J.

In particular, some fragments stored on a subset of the SSDs 206(1)-206(n) assigned to partitions B, F, and J will be require migration to one of the SSDs 206(1)-206(n) assigned to the partition I. Additionally, some fragments stored on the one of the SSDs 206(1)-206(n) assigned to the partition I may need to be moved to another of the SSDs 206(1)-206(n) assigned to partition B. Other types of topology changes can also be implemented in other examples.

Accordingly, in this example, the NIC processor 210 can alter one or more of the seed values from the node seed list, optionally update the revision count, and distribute the updated node seed list to the storage processors 212(1)-212(n). Each of the storage processors 212(1)-212(n) then regenerates the Voronoi tessellation based on the updated node seed list, determines the fragments that require migration based on the resulting partitions of the Voronoi tessellation, and transfers the fragments accordingly. As with the addition and removal of one of the SSDs 206(1)-206(n), a prior node seed list can be maintained and used to service a read request for a fragment not yet migrated.

Referring back to FIG. 3, subsequent to implementing the topology change in step 316, or if the NIC processor 210 of the host computing device 102(1) does not determine that a change of the SSD topology is required and the No branch is taken from step 314, then the host computing device 102(1) proceeds to step 318. In step 318, each of the storage processor 212(1)-212(n) of the host computing device 102(1) optionally performs a background verification. In this example, each of the storage processors 212(1)-212(n) selects an index or object manifest and verifies accessibility by sending TLPs to all other of the SSDs 206(1)-206(n) requesting verification of each fragment in the index. Each of the storage processors 212(1)-212(n) receiving such a request checks that the content can be read and re-computes the fragment value hash to ensure that it matches, which facilitates identification of corruption or bit rot, for example.

Subsequent to performing the background verification, or in parallel in examples in which the background verification is performed as a background process, the host computing device 102(1) proceeds back to step 304. In other examples, one or more of steps 300-318 can be performed in parallel or in a different order by any number of NIC and/or storage processors in the storage network environment 100. While the examples described and illustrated herein utilize erasure coding, fragmentation, and deduplication, one or more of these optimizations can be disabled and/or conditioned on any number of factors such as content, size, and/or load on the storage network environment 100, for example.

Accordingly, this technology is an integration of a high performance low-latency key/value interface as a peer data service that takes advantage of a computational storage architecture. The computational storage architecture reduces bus utilization, as particular computations are performed by the NIC and SSDs processors. This technology uses a combination of innovative approaches to partition computation across distributed resources in order to reduce bus utilization and increase parallelism. The technology performs the computations (e.g., fragmentation, encryption, etc.) required to facilitate data storage at the NIC processors and then communicates over the system bus to the storage processors to store the data. Therefore, the extra bus hop of communicating the data from the network/NIC to a CPU complex to perform the computations is advantageously eliminated, and bus contention is reduced, among other advantages.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
   generating, by a network interface controller (NIC) processor of a computing device, partitions of an n-dimensional space using seed values, wherein each of the seed values represents a point within a respective one of the partitions and the NIC processor is coupled directly to a NIC of the computing device and is separate from a central processing unit (CPU) of the computing device;
   assigning, by the NIC processor, storage devices to respective ones of the partitions;
   generating, by the NIC processor, a first hash based on an application of a hashing algorithm to data associated with a write operation received at the NIC via one or more communication networks, wherein the write operation further comprises a key that identifies a file associated with the write operation;
   identifying, by the NIC processor, one of the partitions within which a data location in the n-dimensional space is located, wherein the data location is determined based on the first hash; and
   communicating, by the NIC processor, the data via a system bus of the computing device to a storage processor of the computing device to facilitate service of the write operation, wherein the storage processor is separate from the CPU and coupled directly to flash media of one of the storage devices that is assigned to the one of the partitions and maintains a key/value store for storing the data.

2. The method of claim 1, further comprising partitioning, by the NIC processor, the n-dimensional space based on the seed values to generate a Voronoi tessellation, wherein the data locations are determined from the Voronoi tessellation and the seed values are provided to the storage processor.

3. The method of claim 1, wherein the data comprises a fragment, the first hash comprises a fragment similarity hash generated for the fragment, the key/value store comprises a second hash for the data, and the second hash comprises a fragment value hash generated for the fragment.

4. The method of claim 3, further comprising storing, by the storage processor, the fragment value hash and the fragment as a key/value pair in the key/value store.

5. The method of claim 3, further comprising discarding, by the storage processor, a key/value pair comprising the fragment value hash and the fragment, without storing the key/value pair in the key/value store, to automatically deduplicate the key/value store, when the fragment value hash matches another fragment value hash in the key/value store.

6. The method of claim 3, further comprising compressing and encrypting, by the NIC processor, the fragment prior to sending the fragment via the system bus to the storage processor.

7. The method of claim 3, further comprising sending, by the NIC processor, the key, the fragment value hash, and the fragment similarity hash to each of a subset of the storage devices to which a key location in the n-dimensional space maps, wherein the key location is determined based on one of a plurality of key hashes generated from the key and the mapped key hashes are non-co-resident with respect to the subset of the storage devices.

8. The method of claim 7, further comprising generating, by the NIC processor, a protection value hash and a protection similarity hash for protection fragments generated using an erasure coding algorithm based on input fragments comprising the fragment and one or more other fragments, wherein the protection similarity hashes are non-co-resident with respect to the subset of the storage devices.

9. The method of claim 8, further comprising storing, by the storage processor, the protection value hashes and the protection fragments as additional key/value pairs in the key/value store, upon receipt of the protection fragments and the protection value hashes from the NIC processor via the system bus, when a protection location determined based on the protection similarity hashes maps to the one of the storage locations in the n-dimensional space.

10. A non-transitory machine readable medium having stored thereon instructions for accelerating storage operations, the instructions comprising executable code that, when executed by a network interface controller (NIC) processor of a computing device, causes the NIC processor to:
generate partitions of an n-dimensional space using seed values, wherein each of the seed values represents a point within a respective one of the partitions and the NIC processor is coupled directly to a NIC of the computing device and is separate from a central processing unit (CPU) of the computing device;
assign storage devices to respective ones of the partitions;
generate a first hash based on an application of a hashing algorithm to data associated with a write operation received at the NIC via one or more communication networks, wherein the write operation further comprises a key that identifies a file associated with the write operation;
identify one of the partitions within which a data location in the n-dimensional space is located, wherein the data location is determined based on the first hash; and
communicate the data via a system bus of the computing device to a storage processor of the computing device to facilitate service of the write operation, wherein the storage processor is separate from the CPU and coupled directly to flash media of one of the storage devices that is assigned to the one of the partitions and maintains a key/value store for storing the data.

11. The non-transitory machine readable medium of claim 10, wherein the executable code, when executed by the NIC processor, further causes the NIC processor to partition the n-dimensional space based on seed values to generate a Voronoi tessellation, wherein the data locations are determined from the Voronoi tessellation and the seed values are provided to the storage processor.

12. The non-transitory machine readable medium of claim 10, wherein the key/value store comprises a second hash for the data, the data comprises a fragment, the first hash comprises a fragment similarity hash generated for the fragment, and the second hash comprises a fragment value hash generated for the fragment.

13. The non-transitory machine readable medium of claim 12, wherein the executable code, when executed by the NIC processor, further causes the NIC processor to compress and encrypt the fragment prior to sending the fragment via the system bus to the storage processor.

14. The non-transitory machine readable medium of claim 12, wherein the executable code, when executed by the NIC processor, further causes the NIC processor to send the key, the fragment value hash, and the fragment similarity hash to each of a subset of the storage devices to which a key location in the n-dimensional space maps.

15. The non-transitory machine readable medium of claim 14, wherein the executable code, when executed by the NIC processor, further causes the NIC processor to generate a protection value hash and a protection similarity hash for protection fragments generated using an erasure coding algorithm based on input fragments comprising the fragment and one or more other fragments, wherein the protection similarity hashes are non-co-resident with respect to the subset of the storage devices.

16. A computing device, comprising:
a memory containing machine readable media comprising machine executable code having stored thereon instructions for accelerating storage operations;
a central processing unit (CPU) coupled to a system bus;
a plurality of storage devices wherein at least one of the storage devices comprises flash media and a storage processor that is coupled directly to the flash media and separate from the CPU; and
a network interface controller (NIC) comprising a NIC processor coupled to the memory and, via the system bus, the storage processor, wherein the NIC processor is separate from the CPU and configured to execute the machine executable code to cause the NIC processor to:
generate partitions of an n-dimensional space using seed values, wherein each of the seed values represents a point within a respective one of the partitions;
assign storage devices to respective ones of the partitions;
generate a first hash based on an application of a hashing algorithm to data associated with a write operation received at the NIC via one or more communication networks, wherein the write operation further comprises a key that identifies a file associated with the write operation;
identify one of the partitions within which a data location in the n-dimensional space is located, wherein the data location is determined based on the first hash; and
communicate the data via a system bus to the storage processor to facilitate service of the write operation, wherein the one of the storage devices is assigned to the one of the partitions and maintains a key/value store for storing the data.

17. The computing device of claim 16, wherein the NIC processor and the storage processor each comprise a reduced instruction set computer (RISC) microprocessor.

18. The computing device of claim 16, wherein the key/value store comprises a second hash for the data and the data and the second hash are sent to the storage processor via one or more transaction layer packets (TLPs) over the system bus bypassing the CPU.

19. The computing device of claim 18, wherein the data comprises a fragment associated with a received write operation, the first hash comprises a fragment similarity hash generated for the fragment, and the second hash comprises a fragment value hash generated for the fragment.

20. The computing device of claim 19, further comprising a configurable hardware logic device coupled to the NIC processor and configured to fragment a write data stream associated with the received write operation to generate the fragment and a plurality of other fragments.

\* \* \* \* \*